US 8,826,053 B2

(12) United States Patent
Kuwabara et al.

(10) Patent No.: US 8,826,053 B2
(45) Date of Patent: Sep. 2, 2014

(54) COORDINATION OPERATION METHOD AND MOBILE COMMUNICATION TERMINAL

(75) Inventors: Masahiko Kuwabara, Tokyo (JP); Kazuo Aoki, Tokyo (JP); Toshiro Matsumura, Tokyo (JP)

(73) Assignee: Vodafone Group PLC, Berkshire (GB)

( * ) Notice: Subject to any disclaimer, the term of this patent is extended or adjusted under 35 U.S.C. 154(b) by 1650 days.

(21) Appl. No.: 11/607,880

(22) Filed: Dec. 4, 2006

(65) Prior Publication Data

US 2007/0077887 A1    Apr. 5, 2007

Related U.S. Application Data

(63) Continuation of application No. PCT/JP2005/011924, filed on Jun. 29, 2005.

(30) Foreign Application Priority Data

Jun. 30, 2004  (JP) ................................. 2004-192747
Mar. 11, 2005  (JP) ................................. 2005-068914
Jun. 13, 2005  (JP) ................................. 2005-172515

(51) Int. Cl.
*G06F 1/00*       (2006.01)
*G06F 9/44*       (2006.01)
*G06F 9/45*       (2006.01)

(52) U.S. Cl.
USPC ........... 713/324; 713/323; 717/120; 717/149; 717/174

(58) Field of Classification Search
None
See application file for complete search history.

(56) References Cited

U.S. PATENT DOCUMENTS

| 6,535,985 | B1 * | 3/2003 | Oshima et al. ................ 713/323 |
| 2003/0041086 | A1 * | 2/2003 | Lankreijer ..................... 709/102 |
| 2003/0100340 | A1 * | 5/2003 | Cupps et al. .................. 455/556 |
| 2003/0143973 | A1 | 7/2003 | Nagy et al. |
| 2004/0059954 | A1 * | 3/2004 | Hoehler ........................ 713/300 |

FOREIGN PATENT DOCUMENTS

| DE | 198 33 035 A1 | | 1/1999 |
| GB | 2 329 268 A | | 3/1999 |
| GB | 2329268 A | * | 3/1999 |
| JP | 62-32510 | | 7/1987 |

(Continued)

OTHER PUBLICATIONS

Supplementary European Search Report, dated Apr. 24, 2009, for EP05765411.3.

(Continued)

*Primary Examiner* — Lewis A Bullock, Jr.
*Assistant Examiner* — Mark Gooray
(74) *Attorney, Agent, or Firm* — Kratz, Quintos & Hanson, LLP

(57) ABSTRACT

An engine processor program, stored in a non-volatile storage region 37 of a storage section 35 connected to a host processor 31 of a host section 30, for execution in an engine processor 41 of an engine section 40, is transmitted from the host section 30 to the engine section 40. The engine processor program received by the engine section 40 is stored in a volatile storage section 42 connected to an engine processor 51. Then, the host section 30 notifies an execution instruction for a specified program, among the engine processor programs stored in the storage section 42, to the engine section 40 and causes execution on the engine processor 41. As a result, even in a structure provided, the engine section 40 does not need a large capacity non-volatile storage region, thereby configuring a compact mobile communication terminal.

20 Claims, 24 Drawing Sheets

(56) References Cited

FOREIGN PATENT DOCUMENTS

| | | |
|---|---|---|
| JP | 2-40760 | 2/1990 |
| JP | 04-104358 | 4/1992 |
| JP | 11-39143 | 2/1999 |
| JP | 2002-297483 | 10/2002 |
| JP | 2003-125076 | 4/2003 |
| WO | 97/32439 | 9/1997 |
| WO | 01/40931 | 6/2001 |
| WO | 2004/003759 | 1/2004 |
| WO | 2004/021684 | 3/2004 |

OTHER PUBLICATIONS

Written Opinion of the International Searching Authority for PCT/JP2005/011924.

* cited by examiner

COORDINATION OPERATION METHOD AND MOBILE COMMUNICATION TERMINAL

RELATED APPLICATION

This a continuation application of the international patent application No. PCT/JP2005/011924 filed with Application date: Jun. 29, 2005. The present application is based on, and claims priority from, J.P. Application 2004-192747, filed on Jun. 30, 2004, J.P. Application 2005-068914, filed on Mar. 11, 2005 and J.P. Application 2005-172515, filed on Jun. 13, 2005, the disclosure of which is hereby incorporated by reference herein its entirety.

BACKGROUND OF THE INVENTION

The present invention relates to a coordination operation method and a mobile communication terminal, and in more detail relates to a coordination operation method, in which a host section for performing processing relating to communication with an external section, and an engine section for executing applications, under management by the host section, are operated in a coordination fashion in a mobile communication terminal, and a mobile communication terminal using the cooperation operation method.

BACKGROUND ART

Mobile communication terminals such as portable telephones have become widespread in recent years. The advance of technology relating to such mobile communication terminals, and particularly mobile phones, has been remarkable, and in addition to communication functions via a mobile communication network, which are the prerequisite functions for a mobile communications terminal, additional functions in order to enjoy games and musical appreciation have been implemented.

With this type of mobile communication terminal, a processor is built-in for carrying out various data processing in order to achieve the above described prerequisite functions and additional functions. Resources, such as a storage section including storage elements for storing various programs and data, a wireless communication section for carrying out wireless communication, an operation section for a user to perform operational instructions, and a notification section (display output section and audio output section) for notifying various information to the user, are connected to this processor.

The processor executes programs stored in the storage section, and as required achieves the above described prerequisite functions and additional function by appropriately controlling the connected resources. Note that the storage section is comprised of a non-volatile section in which contents are not corrupted even if supply of power is interrupted, and a volatile section in which contents are not guaranteed if the supply of power is interrupted. A program would be stored in the non-volatile section so that it will not be lost if the supply of power is interrupted.

SUMMARY OF THE INVENTION

As described above, with the mobile communication terminal of the related art, since it is necessary to achieve various functions the built in processor is a general purpose processor. This leads to a simple structure for a device, and a method that is excellent from the viewpoint of miniaturization and reduced power consumption of the device. However, with the use of a general purpose processor, even if there is a desire for improvements to characteristics in additional function operations in order to enjoy games or music, for example, rapid improvement in characteristics is difficult.

By the way, when comparing to other information processing devices, requiring improvement in characteristics of the mobile communication terminal can be called additional functional operation. Additional function operation requiring these types of characteristic improvements are basically game execution and music playback and so forth, however at the time of this type of additional function operation, there is a large load placed on the processor, particularly by image display processing and audio data output processing.

Also, for a mobile communication terminal, there is a demand to achieve the above described prerequisite functions and additional functions, but since there is generally only a single user, there has been no demand for the prerequisite functions and additional functions to operate independently at the same time, whatever the situation. For example, there is also no demand to carry out game operations, which are additional function operation, while carrying out call operation, which is a prerequisite operation.

For the above mentioned reasons, it has been considered to install an engine processor that is dedicated to additional functions, and that is excellent for image display processing and audio data output processing, and execute applications corresponding the additional function operations in an engine section provided with an engine processor, under the supervision of a host section provided with a host processor that is a processor for carrying out call operations. In having an architecture where the overall device is compact while adopting a structure provided with a host section and an engine section, it is considered essential to operate both the host section and the engine section in a cooperation manner while exercising utmost control over redundancy of structural elements.

However, with respect to linking the host section and the engine section in order to exert the utmost control over redundancy of structural elements of the device while adopting a structure provided with the host section and the engine section, in a mobile communication device, the current situation that no specific technology has been proposed.

The present invention has been conceived in view of the above described problems, and an object of the invention is to provide a coordination operation method capable of a compact overall structure of a device, in a structure provided with a host section, having a host processor, for carrying out processing relating to communication with external sections, and an engine section, having an engine processor, for executing applications under the supervision of the host section.

It is also an object of the invention to provide a mobile communication terminal provided with a host section for carrying out processing relating to communication with external sections, and an engine section for executing applications under the supervision of the host section, and capable of a compact overall structure for a device.

A first aspect of the present invention is a coordination operation method, in which a host section for performing processing relating to communication with an external section, and an engine section for executing applications using at least one of a display output section and an audio output section under supervision of the host section, are operated in a cooperation fashion in a mobile communication terminal, comprising the steps of: transmitting an engine processor program, stored in non-volatile storage means connected to the host processor of the host section, for execution in the engine processor of the engine section, from the host section to the engine section; the engine section that has received the engine processor program storing to volatile engine storage means connected to the engine processor; the host section transmitting an execution instruction for a particular program, being one engine processor program stored in the engine storage means, from the host section to the engine section; and the engine processor executing the particular program using the engine storage means, in the engine section that has received the execution instruction of the particular program.

With this coordination operation method, first of all, in the program transmission step, an engine processor program, stored in non-volatile storage means connected to the host processor of the host section, for execution in the engine processor of the engine section, is transmitted from the host section to the engine section. At this time, the host processor reads out an engine processor program that will be executed in the engine processor from the non-volatile storage means, and transmits the program to the engine section.

In the engine section that has received the engine processor program, in the program storage step, the engine processor program is stored in the volatile storage means connected to the engine processor of the engine section. At this time, in the engine section the engine processor received the engine processor program and writes it into the volatile storage means.

After that, in a program execution commencement notification step, the host section notifies an execution instruction for a particular program, being one engine processor program is stored in the volatile storage means connected to the engine processor of the engine section, to the engine section. This notification of an execution instruction for a particular program is carried out according to an instruction by the user, for example.

At the engine section that has received the execution instruction for a particular program, in a program execution step the engine processor executes the particular program. That is, the engine processor executes by reading out the particular program from the volatile storage means connected to itself.

As described above, in order to execute a desired program on the engine processor, the desired program is transmitted from the host section, which means that in the engine section, it is sufficient to store in the non-volatile storage section only a basic interface program for acting as an interface to the host section while being able to provide a function for receiving program data, as a program executed by the engine processor.

This type of basic interface program is small in size and it is possible to incorporate into the chip for the engine processor. For this reason, it is not necessary to uniquely provide large capacity non-volatile storage means for the purpose of preventing loss of the program executed by the engine processor due to power supply being turned off.

It is therefore possible to suppress increase in hardware amount in the device overall, even when providing an engine processor in addition to the host processor, by using the coordination operation method of the present invention. It is therefore possible for the coordination operation method of the present invention to contribute to a compact overall device structure in a structure provided with a host section, having a host processor, for carrying out processing relating to communication with external sections, and an engine section, having an engine processor, for executing applications under the supervision of the host section. By having the host section that carries out processing related to communication with external sections supervise saving of an engine processor program, it is also possible to have a more open structure where it is capable of acquiring the engine processor program itself, inconvenient amendment information and version upgrade information for the engine processor program and so forth through communication with external section.

With the coordination operation method of the present invention, it is possible for the engine processor program transmitted from the host section to include an integrated control program for integrated control of the engine section, and application programs. In this case, the basic interface program built into the engine processor in advance can be limited in a function for loading an engine integrated control program, and it is possible to prevent the occurrence of inconvenience and to do away with the need for upgrade. It is therefore possible to improve reliability of the engine processor, and under control of the engine integrated control program, having functions and characteristics for which inconvenient improvements and upgrade can be perfected, it is possible to execute a diversity of engine processor programs.

In this case, with the coordination operation method of the present invention, transmission of the engine integrated control program from the host section to the engine section can be carried out at the time of initialization of the engine section. In this case, it is possible to carry out interaction with the host section, such as receipt of all application programs and application data, or receipt of all application execution instructions, and to execute applications, under control of the engine integrated control program, having perfected functions and characteristics.

It is also possible for the application program to be transmitted from the host section to the engine section after commencement of execution of the engine integrated control program for the engine section.

With the coordination operation method of the present invention, it is possible to further comprising the steps of: the engine section transmitting a save request for specified data relating to the application to the host section; and the host section that has received the save request for the specified data saving the specified data in a specified data save region ensured within the non-volatile storage means in correspondence with the application.

In this case, when specified data, which is data to be saved in the host section, occurs due to execution of an application in the engine section, the engine section transmits a save request for specified data relating to the application in the data save request step. The host section that has received this data save request saves specified data requested to be saved in the specified-data save region ensured in correspondence with the application. The specified data save region can be a region of a predetermined capacity ensured for each application, or a region ensured in accordance with capacity that is required for respective applications. Note that the specified data having a possibility of being used when executing an application again after stopping the application, or data generated as a result of application execution.

Therefore, under control of the host section, when commencing execution again in the engine section after temporarily stopping the application, it becomes possible to use the specified data for execution of the application, as required, by transmitting the specified data relating to the application from the host section to the engine section. It also becomes possible to use the specified data saved in the host section under conditions desired by the user.

As a result, specified data relating to a stopped application is still saved even after the application is stopped, and there is no need to prepare resources in the engine section. Accordingly, according to the coordination operation method of the present invention, since there is no need to provide non-volatile storage means for storing data relating to the application in the engine section, it is possible to achieve a compact overall device structure, and it is possible to improve user convenience.

In this case, it is possible to further comprise the steps of: the engine section performing an enquiry for amount of free space of the specified data save region, to the host section; the host section that has received the enquiry reporting the amount of free space; and the engine section that has received the notification determining whether or not it is possible to save the special data in the free region; and, if the determination result of the save possibility determination step is affirmative, the data save request step is executed.

In this case, when saving specified data that should be saved in the host section during execution of pausing of an application in the engine section, first of all, in the free space amount enquiry step, the engine section sends an enquiry about amount of free space in the specified data save region to the host section. The host section that receives this enquiry notifies the amount of free space to the engine section in the free space notification step.

The engine section that receive the free space notification determines whether or not the specified data can be saved in the free space region in the save possibility determination step. Then, if the result of this determination is affirmative, the above-described data save request step is executed.

Therefore, the data save request step is executed, but it is possible to prevent the occurrence of a situation where the specified data cannot be saved due to the amount of free space being insufficient.

Note that, when the determination result in the save possibility determination step is negative, the user is prompted to select either to carry out free space securement or to abandon saving of specified data this time. Then, if securement of free space is selected, the user performs an operation to delete data that is being saved at a lower priority than the current specified data. After achieving the free space securement in this way, operations are started again from the free space enquiry, in response to a user instruction. As a result, the specified data for this time are saved in the host section.

It is also possible to further comprise a step of the engine section confirming to a user whether or not the specified data is saved, and executing the data save request step if there is affirmative confirmation in the data save confirmation step. In this case, since the data save confirmation step for confirming whether or not specified data is saved to the user is carried out before the data save request step, it is possible to prevent saving undesired data to the host section.

It is also possible for information data for restarting the application to be included in the specified data. In this case, it is possible to restart an application from a state where the application was stopped previously, by causing specified data to be supplied from the host section when commencing application execution in the engine section.

It is also possible for data designated with a data save command by a user to be included in the specified data. In this case, specified data, resulting from execution of an application in the engine section, can be used in a state desired by the user, such as transmitted to an acquaintance via communication network, for example.

With the coordination operation method of the present invention, it is possible to further comprise the steps of: the host section transmitting to the engine section a restart information save request for requesting save of engine restart information, for restarting processing in the engine section, in the engine storage means; the engine section that has received the restart information save request saving the restart information in the engine storage means; the host section stopping supply of operational power to the engine processor; the host section instructing use of the restart information when restarting processing in the engine section; the host section restarting supply of operational power to the engine processor; and the engine section restarting processing using the restart information.

In this case, when it is estimated that there is no need to cause operation of the engine processor of the engine section, in the restart information save request step the host section transmits a restart information save request to the engine section to request save of the engine restart information for restarting processing in the engine section to the engine storage means. The engine section that has received this restart information save request saves the restart information in the engine storage means in the restart information save step. As information saved in this manner, there are, for example, information for state and supervision resource for the control program for controlling operation of the engine section, and information for state and supervision resource for an application operating under supervision of the control program.

In this manner, if the save of the restart information in the engine section is complete, the host section stops supply of operational power to the engine processor in the engine processor operation power supply stop step. As a result, supply of operational power to the engine processor is stopped, and power consumption due to operation of the engine processor is stopped. In this case, in the event that the storage region for the restart information in the engine storage means is non-volatile, it is also possible to stop supply of operating power to the engine storage means, but if the engine storage means is volatile supply of operating power to the engine storage means is continued. Therefore, loss of restart information saved in the engine storage means due to cessation of supply of operating power to the engine processor is avoided.

After this, if it becomes necessary to restart processing by the engine processor corresponding to a user command and so forth, the host section designates using the restart information saved in the engine storage means in the restart information use mode designation step when restarting the processing in the engine section. The host section then restarts supply of operational power to the engine processor in the restart engine processor operational power supply step. Note that, it does not matter if the restart information use mode designation step is before or after the user instruction, as long as it is executed before execution of the restart engine processor power supply step.

If supply of operation power to the engine processor is restarted in this way, an initialization program executed immediately after restarting supply of power is executed, and it is determined whether or not restart information use mode has been set. Then, if the restart information use mode has been set, in the restart information use processing restart step the process continuing from before suspension of operational power to the engine processor is restarted using the restart information.

Therefore, when it is estimated that it will not be necessary to cause operation of the engine processor in the engine section, the supply of operating power to the engine processor is stopped. Also, if the need to restart operation of the engine processor arises after that, processing from the point in time that supply of operating power to the engine processor was stopped is restarted, without loading the program and data from the host section to the engine section. It is therefore possible to anticipate power conservation for the mobile communication terminal while maintaining convenience to the user, without providing non-volatile storage means for storing restart information in the engine section.

In this case, it is possible to further comprising the steps of: the host section transmitting to the engine section an operational power cessation advance notice for giving prior notice of stopping of operational power to all sections of the engine section; the engine section that has received the operational power cessation advance notice notifying application restart information, being restart information for the application, to the host section; the host section that has received the application restart information saving the application restart information in the non-volatile storage means; the host section stopping supply of operational power to all sections of the engine section; the host section designating that initialization processing should be carried out, when restarting processing in the engine section; the host section restarting supply of operational power to all sections of the engine section; the engine section starting the initialization processing; and the host section transmitting the application program and the application restart information to the engine section.

In this case, when the supply of operating power to whole of the engine section is stopped, such as when the power supply to the mobile communication terminal is turned off, the host section transmits an operating power cessation advance notification, for notifying cessation of supply of operating power to whole of the engine section, to the engine section in the operating power cessation advance notification step. Application restart information, being restart information for the application, is notified to the host section by the engine section that has received this operational power cessation advance. In this case, "application restart information" can also include restart information for a temporarily stopped application, in addition to restart information for an application that is being executed. In this specification, the expression "application restart information" is used with this meaning.

The host section that has received the application restart information saves the application restart information in the non-volatile storage means of the host section in the application restart information save step, and in the engine section operating power cessation step the host section stops supply of operating power to the whole of the engine section. As a result, the storage contents of the engine storage means are lost.

After this, if it becomes necessary to restart processing by the engine section corresponding to a user command and so forth, in the initialization mode designation step it is designated that initialization processing should be carried out when restarting the processing in the engine section. The host section then restarts supply of operational power to the whole of the engine section in the restart engine section operational power supply step. Note that, it does not matter if the initialization mode designation step is before or after the user instruction, as long as the restart engine section power supply step is executed.

If supply of operation power to the whole of the engine section is restarted in this way, an initialization program executed immediately after restarting supply of power is executed, and it is determined whether or not initialization mode has been set. Then, if initialization mode has been set, initialization processing for the engine section is executed in the initialization step.

Continuing on, after loading the control program for controlling operation of the engine section from the host section to the engine section and so forth, if load for the application is instructed by the user, the application and application restart information is transmitted by the host section to the engine section in the application load step. The application is then executed from the start or from the state represented by the application restart information in accordance with an instruction by the user.

In this case therefore, since two states of operational power supply to the engine section are prepared taking into consideration restart of processing in the engine section, it is possible to carry out fine control taking into consideration operational power to the engine section.

It is possible for the restart information save request step to be executed when an event occurs that estimates that the application will not restart for a while. In this case it is possible to anticipate reasonable power conservation.

In this case, the event can be the lapse of a predetermined time after pause of the application.

A second aspect of the present invention is a mobile communication terminal, in which a host section for performing processing relating to communication with an external section, and an engine section for executing applications using at least one of a display output section and an audio output section under supervision of the host section, are operated in a coordination fashion, wherein the host section comprises: a host processor; non-volatile storage means, connected to the host processor, for storing an engine processor program for transmission to the engine section; program transmission means for reading out the engine processor program from the non-volatile storage means and transmitting to the engine section; and program execution commencement instruction means for designating a particular program, among engine processor programs transmitted to the engine section, and transmitting an execution instruction of the specified program in the engine section to the engine section, and the engine section comprises: an engine processor; volatile engine storage means, connected to the engine processor, for storing the engine processor programs transmitted from the host section; and program storage means, for storing the engine processor programs transmitted from the host section in the engine storage means.

With this mobile communication terminal, the program transmission means inside the host section transmits an engine processor program, stored in non-volatile storage means connected to the host processor of the host section, for execution in the engine processor of the engine section, from the host section to the engine section. At the engine section that has received this engine processor program, the program storage means stores the engine processor program in the volatile storage means connected to the engine processor of the engine section.

After that, program execution commencement notification means inside the host section, notifies an execution instruction for a particular program, being one engine processor program is stored in the volatile storage means connected to the engine processor of the engine section, to the engine section. At the engine section that has received this execution instruction for a particular program, program execution means executes the particular program.

That is, with the mobile communication terminal of the present invention, since coordination operation between the host section and the engine section is carried out using the coordination operation method of the present invention described above, it is possible to have a structure where non-volatile storage means is not provided in the engine section. Therefore, according to the mobile communication terminal of the invention, it is possible to achieve compact overall device structure, while providing a host section for carrying out processing relating to communication with external sections, and an engine section for executing applications under the supervision of the host section.

With the mobile communication terminal of the present invention, it is possible for the engine section to comprise data save request means for transmitting a save request for specified data relating to the application to the host section, and for the host section to further comprise data save means for saving the specified data in a specified data save region ensured within the non-volatile storage means in correspondence with the application, in response to the specified data save request.

In this case, when specified data, which is data to be saved in the host section, occurs due to execution of an application in the engine section, the data save request means of the engine section transmits a save request for specified data relating to the application. At the host section that has received this data save request, the data save means saves specified data requested to be saved in the specified data save region ensured in correspondence with the application.

Accordingly, according to the mobile communication terminal of the present invention, since there is no need to provide non-volatile storage means for storing data relating to the application in the engine section, it is possible to achieve a compact overall device structure, and it is possible to improve user convenience.

In this case, it is possible for the engine section further comprise: free space enquiry means for performing an enquiry for amount of free space of the specified data save region, to the host section; and save possibility determination means, for determining whether or not it is possible to save the specified data in the free space based on response results from the host section to the enquiry by the free space enquiry means, and for the host section to further comprise free space notification means for notifying the amount of free space in response to the enquiry, and when the determination result by the save possibility determination means is affirmative, the specified data save request is performed by the data save request means.

In this case, when saving specified data that should be saved in the host section during execution or execution of pausing an application in the engine section, first of all the free space amount enquiry means of the engine section sends an enquiry about amount of free space in the specified data save region to the host section. At the host section that receives this enquiry, the free space notification means notifies the amount of free space to the engine section.

At the engine section that receives the free space notification, the save possibility determination means determines whether or not the specified data can be saved in the free space region. Then, if the result of this determination is affirmative, the data save request means transmits a save request for the specified data to the host section.

Therefore, the data save request is executed, but it is possible to prevent the occurrence of a situation where the specified data cannot be saved due to the amount of free space being insufficient.

It is also possible for the engine section to further comprise data save confirmation means for confirming to a user whether or not the specified data is saved, and when the confirmation by the data save confirmation means is affirmative, the specified data save request is performed by the data save request means. In this case, since the data save confirmation means of the engine section confirms whether or not specified data is saved to the user before the data save request, it is possible to prevent saving undesired data to the host section.

With the mobile communication terminal of the present invention, it is possible to comprise operational power supply control means, for independently controlling operational power supply to the engine processor and operation power supply to the engine storage means in response to operational power supply instructions from the host section; process restart mode notification means for notifying process restart mode to the engine section in response to a process restart mode setting instruction from the host section; and for the host section to further comprise: restart information save request means for transmitting to the engine section, a restart information save request for requesting save of engine restart information, for restarting processing in the engine section, in the engine storage means; engine processor operational power supply instruction means, for transmitting an engine processor operational power supply stop command, for stopping supply of operational power to the engine processor, and an engine processor operational power supply stop command for restarting supply of operational power to the engine processor, to the operational power supply control means; and restart information usage mode setting instruction means for transmitting a setting instruction for notification of restart information usage mode for using the restart information to the process restart mode notification means, when restarting a process in the engine section, and for the engine section to further comprise restart information save means for saving the restart information in the engine storage section.

With this mobile communication terminal, when it is estimated that there is no need to cause operation of the engine processor of the engine section, the restart information save request means of the host section transmits a restart information save request to the engine section to request save of the engine restart information for restarting processing in the engine section to the engine storage means. The restart information save means of the engine section that has received this restart information save request saves the restart information in the engine storage means.

In this manner, if the save of the restart information in the engine section is complete, the engine processor operation power supply stop means of the host section stops supply of operational power to the engine processor. After this, if it becomes necessary to restart processing by the engine processor corresponding to a user command and so forth, the restart information use mode designation means of the host section designates using the restart information saved in the engine storage means when restarting the processing in the engine section. The restart engine processor operational power supply means of the host section then restarts supply of operational power to the engine processor. After that, the engine section restarts the process having continuity from before cessation of operational power to the engine processor using the restart information Accordingly, with the mobile communication terminal of the present invention it is possible to anticipate power conservation while maintaining user convenience.

In this case, it is possible for the host section to further comprise: operational power cessation advance notification means, for transmitting to the engine section, an operational power cessation advance notice for giving prior notice of stopping of operational power to all sections of the engine section; engine section operational power supply instruction control means, for transmitting an engine section operational power supply stop command, for stopping supply of operational power to the whole of the engine section, and an engine section operational power supply stop command for restarting supply of operational power to the whole of the engine section, to the operational power supply control means, initialization mode setting instruction means for transmitting a setting instruction for notification of initialization mode to the process restart mode notification means, when restarting a process in the engine section; and application restart information save means for saving application restart information notified from the engine section in the non-volatile storage section, and for the engine section to further comprise application restart information notification means for notifying the application restart information to the host section when an operational power cessation advance notification is received.

With the mobile communication terminal of the present invention, it is possible for the host section to further comprise a wireless section, connected to the host processor, for carrying out wireless communication with a base station of a mobile communication network.

As described above, by adopting the coordination operation method of the present invention the effect is achieved of making it possible to contribute to give a mobile communication terminal a compact overall architecture, in a structure provided with a host section for carrying out processing relating to communication with external sections, and an engine section for executing applications under the supervision of the host section.

Also, according to the mobile communication terminal of the invention, the effect is achieved of making it possible to achieve compact overall device structure, while providing a host section for carrying out processing relating to communication with external sections, and an engine section for executing applications under the supervision of the host section.

DETAILED DESCRIPTION

One embodiment of the present invention will be described in the following with reference to FIG. 1A-FIG. 27. In these drawings, elements that are the same or equivalent have the same reference numbers assigned, and repeat description will be omitted.

[Device Structure]

Figure 1A:
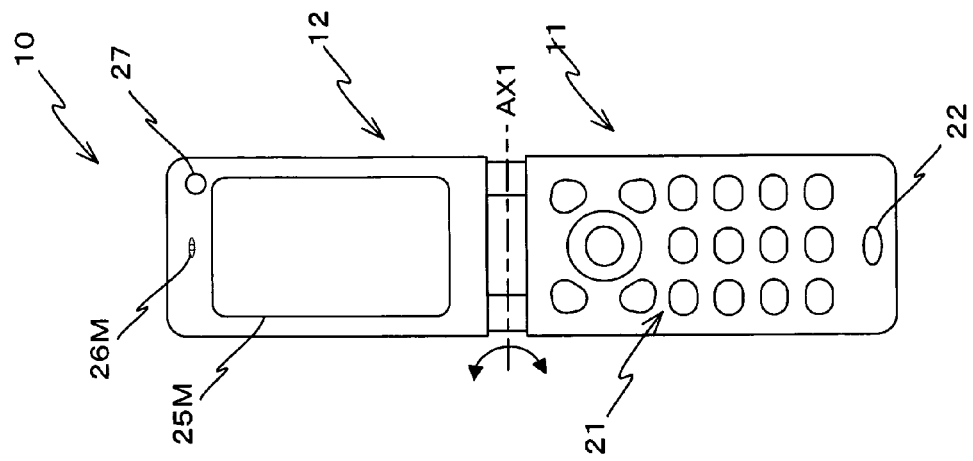
FIG. 1A is a view schematically showing the external appearance of a front side of a mobile telephone of an embodiment of the present invention.
Figure 1B:
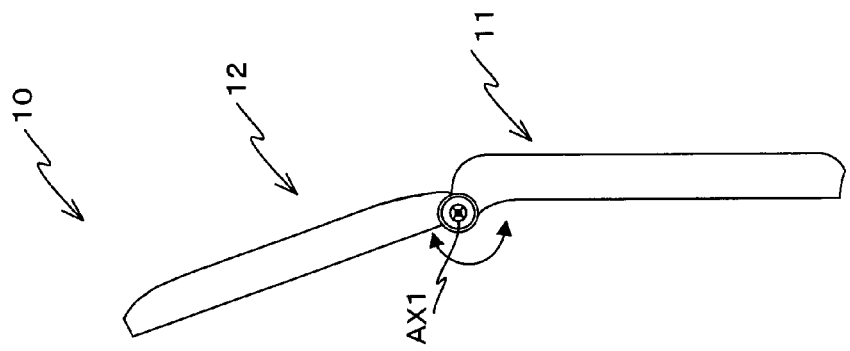
FIG. 1B is a view schematically showing the external appearance of a right side of a mobile telephone of an embodiment of the present invention.
Figure 1C:
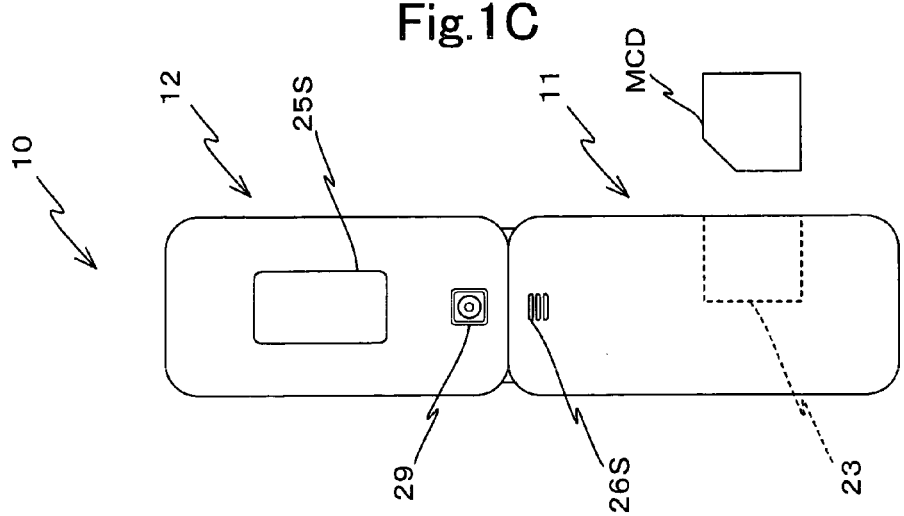
FIG. 1C is a view schematically showing the external appearance of a rear of a mobile telephone of an embodiment of the present invention.
Figure 2:
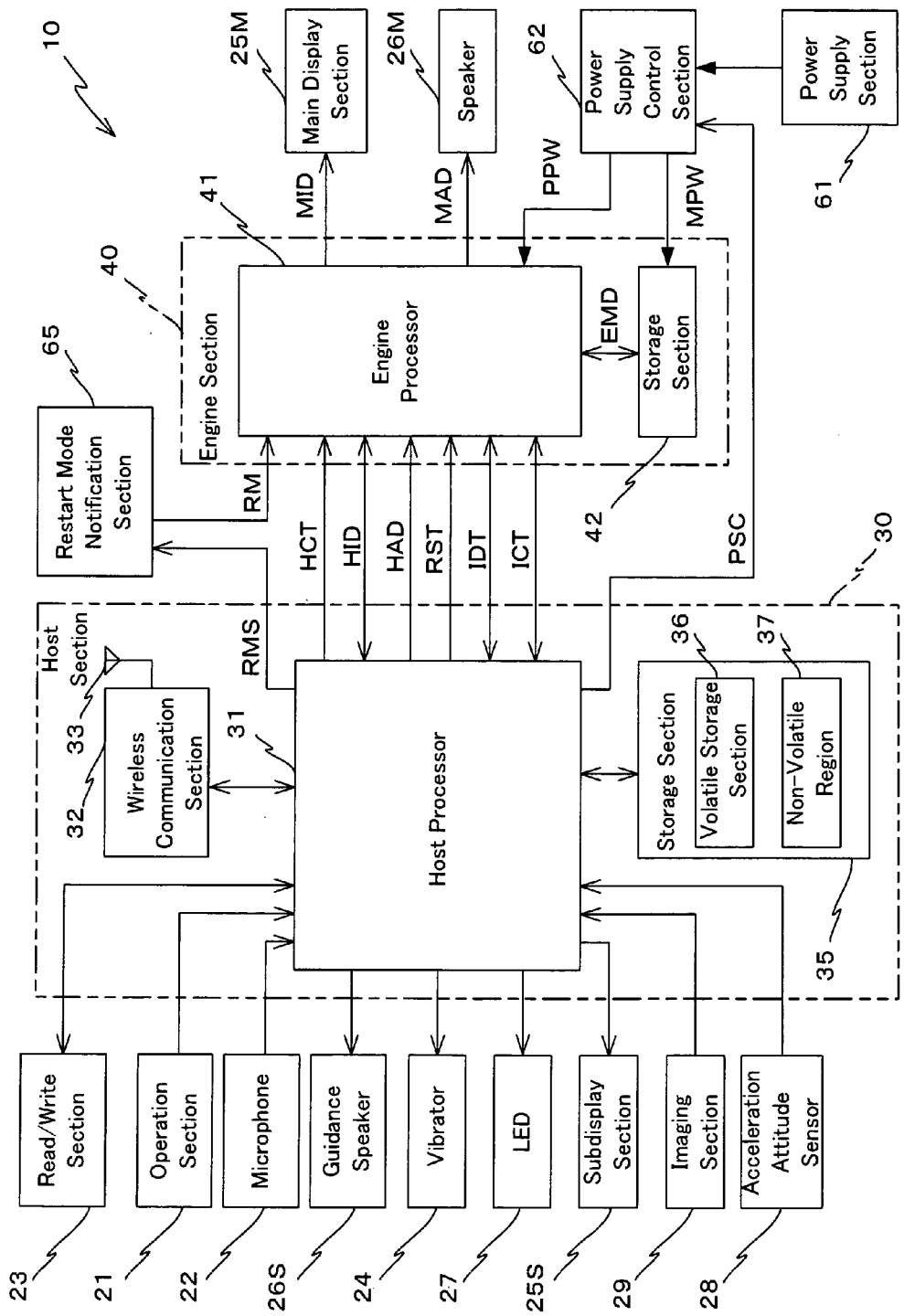
FIG. 2 is block diagram for describing the functional structure of the mobile telephone of FIG. 1A-1C.

The structure of a mobile telephone unit 10, being a mobile communication terminal of the embodiment of the present invention, is shown schematically in FIG. 1A-FIG. 2. This mobile telephone unit 10 is of a so-called clamshell type capable of being folded up. In this case, a front view of the external appearance of the mobile telephone unit 10 in an opened out state is shown in FIG. 1A, a right side view of the external appearance of the mobile telephone unit 10 is shown in FIG. 1B, and a rear view of the external appearance of the mobile telephone unit 10 is shown in FIG. 1C. Also, the functional block structure of the mobile telephone unit 10 is shown in FIG. 2.

As shown in FIG. 1A-FIG. 1C, the mobile telephone unit 10 comprises a first section 11, and a second section 12 capable of being rotate with respect to the first section 11 with axis AX1 as a central axis.

As shown in FIG. 1A, (i) an operating section 21 on which operating keys such as a ten-key pad or function keys are arranged, and (ii) a microphone 22 for inputting audio at the time of a call are arranged on the first section 11. Also, as shown in FIG. 1C, (iii) a guidance speaker 26S for generating incoming audio and guidance audio is arranged on the rear surface side of the first section 11 when the arrangement surface of the operating section 21 is to the front. Also, as shown in FIG. 1C, (iv) a read out/write section 23 for reading data out from a storage medium MCD and writing data to the storage medium MCD is arranged inside the first section 11.

As shown in FIG. 1A, (v) a main display 25M for displaying image operating guidance, operating state, received messages, image results from an imaging section 29, that will be described later, and images due to an engine application and so forth, (vi) a speaker 26M for reproducing audio signals that have been sent from a calling party at the time of a call, and (vii) an LED (light emitting diode) 27 for urging caution to the user, are arranged in the second section 12. Also, as shown in FIG. 1C, (viii) a sub-display section 25S for performing auxiliary display, and (ix) an imaging section 29 for capturing images with a field of view of an image forming optical system, are arranged on a rear surface of the second section 12, with the main display surface of the main display section 25M to the front.

Also, as shown in FIG. 2, the mobile telephone unit 10 is further comprised of (x) a vibrator 24 for notifying the user of an incoming call by causing the mobile telephone unit 10 to vibrate at the time of an incoming call, and (xi) an acceleration/attitude sensor 28 for detecting acceleration acting on the mobile telephone unit 10 and attitude of the mobile telephone unit 10. The vibrator 24 and the acceleration/attitude sensor 28 are arranged inside the mobile telephone unit 10.

The mobile telephone unit 10 is also comprised of (xii) a host section 30 for fulfilling basic functions as a mobile telephone unit, such as call functions, and (xiii) an engine section 40 for carrying out execution of engine applications. The host section 30 and the engine section 40 are arranged inside the mobile telephone unit 10.

The mobile telephone unit 10 also comprises (xiv) a power supply section 61 for supplying operational power to the whole of the mobile telephone unit 10, (xv) a power supply control unit 62 for controlling supply of power to the engine section 40, in accordance with a power supply control command PSC from the host section 30, that will be described later, and (xvi) a restart mode notification section 65 for notifying a restart mode RM at the time of commencing power supply to the engine section 40 and restarting a process after restart to the engine section 40, in accordance with a restart mode setting command RMS from the host section 30. Note that power supply control by the power supply control section 62 and restart mode notification by the restart mode notification section 65 will be described later. The power supply section 61, power supply control section 62 and restart mode notification section 65 are arranged inside the mobile telephone unit 10.

The host section 30 is comprised of a host processor 31 for integrated control of the mobile telephone unit 10, a wireless communication section 32 for carrying out transceiving communication signal via an antenna 33, and a storage section 35 for storing programs and data. The above described operation section 21, microphone 22, guidance speaker 26S, LED 27, sub-display section 25S and vibrator 24 are also connected to the host processor 31.

A central processing unit (CPU) function and a digital signal processor (DSP) function are incorporated into the host processor 31. Moreover, as a result of the host processor 31 performing execution to read out a host program 38 (refer to FIG. 3) stored in the storage section 35, basic operating functions such as call function operations, and exchange of various data with the engine section 40 are carried out.

Figure 3:
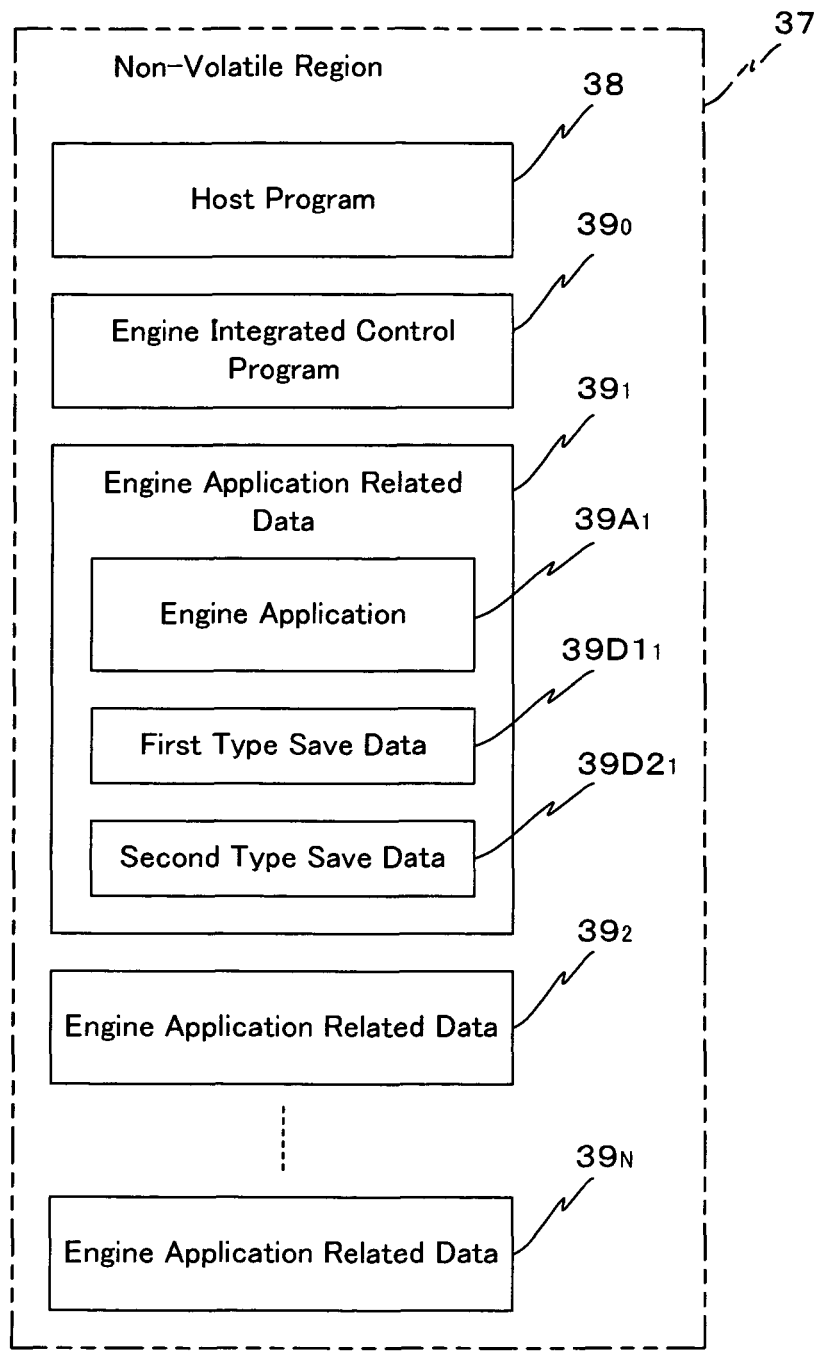
FIG. 3 is drawing for describing the internal structure of a non-volatile storage region in the storage section of a host section in FIG. 2.

The storage section 35 is comprised of a volatile storage region 36 for temporarily storing various data, and a non-volatile region 37 for permanently storing programs and so forth. The volatile region 36 is constructed using volatile storage elements for which storage content is not guaranteed if supply of operational power is lost. Also, the non-volatile region 37 is constructed from non-volatile storage elements for which stored content is guaranteed even if the supply of operational power is lost. As shown in FIG. 3, in addition to the above-described host program 38, an engine integrated control program $39_0$ executed in the engine section 40 and data $39_1, 39_2, \ldots 39_N$ relating to the engine application are stored in the non-volatile region 37.

Respective engine application related data $39_j$ (j=1~N) includes engine application $39A_j$, first type save data $39D1_j$ and second type save data $39D2_j$, as exemplified in engine application related data $39_1$ in FIG. 3

In this case, the first type save data $39D1_j$ is data used, in the event of commencing restart execution after execution of engine application $39A_j$ in the engine section 40 has been suspended, by the engine application $39A_j$, for example, data required for restarting from a state at the time of the previous suspension, when executing that restart. On the other hand, the second type save data $39D2_j$ is data that is not used by the engine application $39A_j$ when executing the restart, for example, image data for a particular scene, selected according to the users liking during execution of the engine application $39A_j$ (so-called best shot image data taken by the user).

Therefore, an execution commencement command for engine application $39A_j$ that has finished loading from the host section 30 to the engine section 40 has application identification data and, when it exists, first type save data $39D1_j$ attached.

Note that, with this embodiment, the size of regions for respectively storing the first type save data $39D1_j$ and the second type save data $39D2_j$ in the non-volatile region 37 is predetermined.

Figure 4:
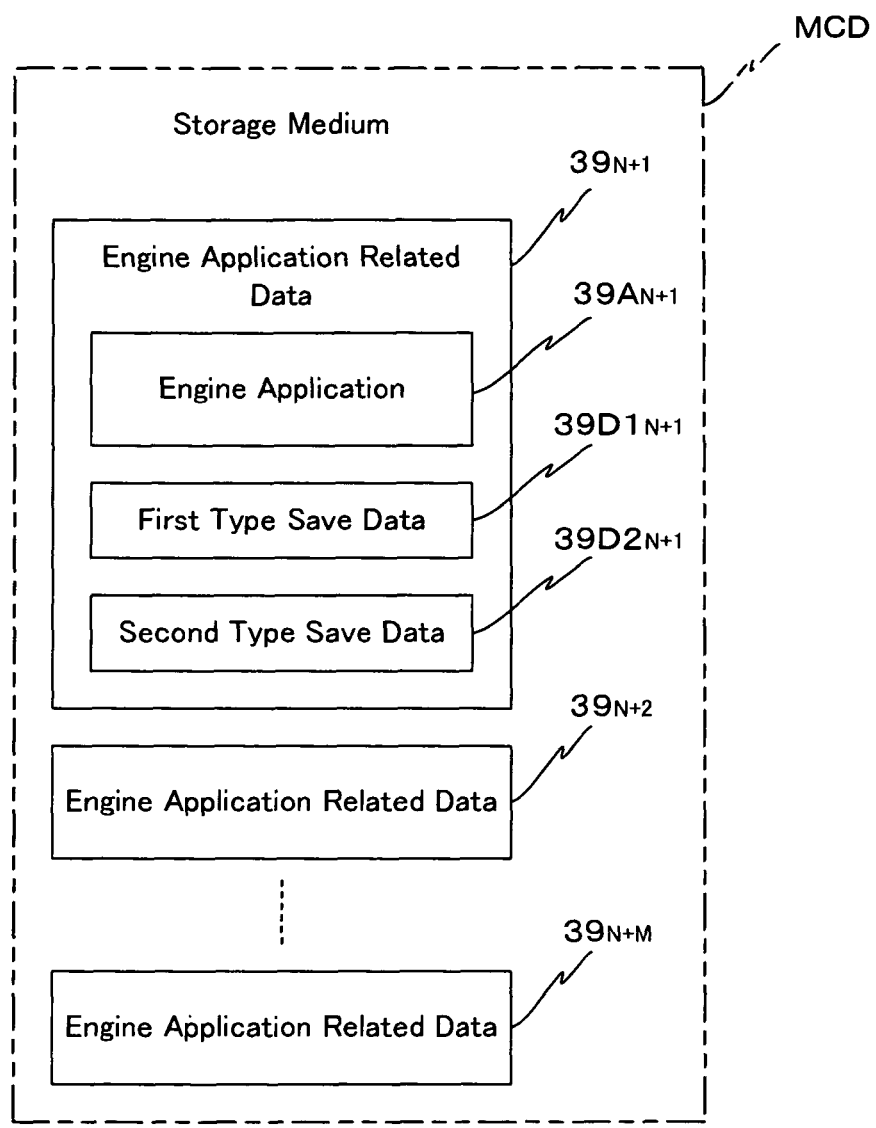
FIG. 4 is block drawing for describing contents of a storage medium of FIG. 1A-1C.
Figure 5:
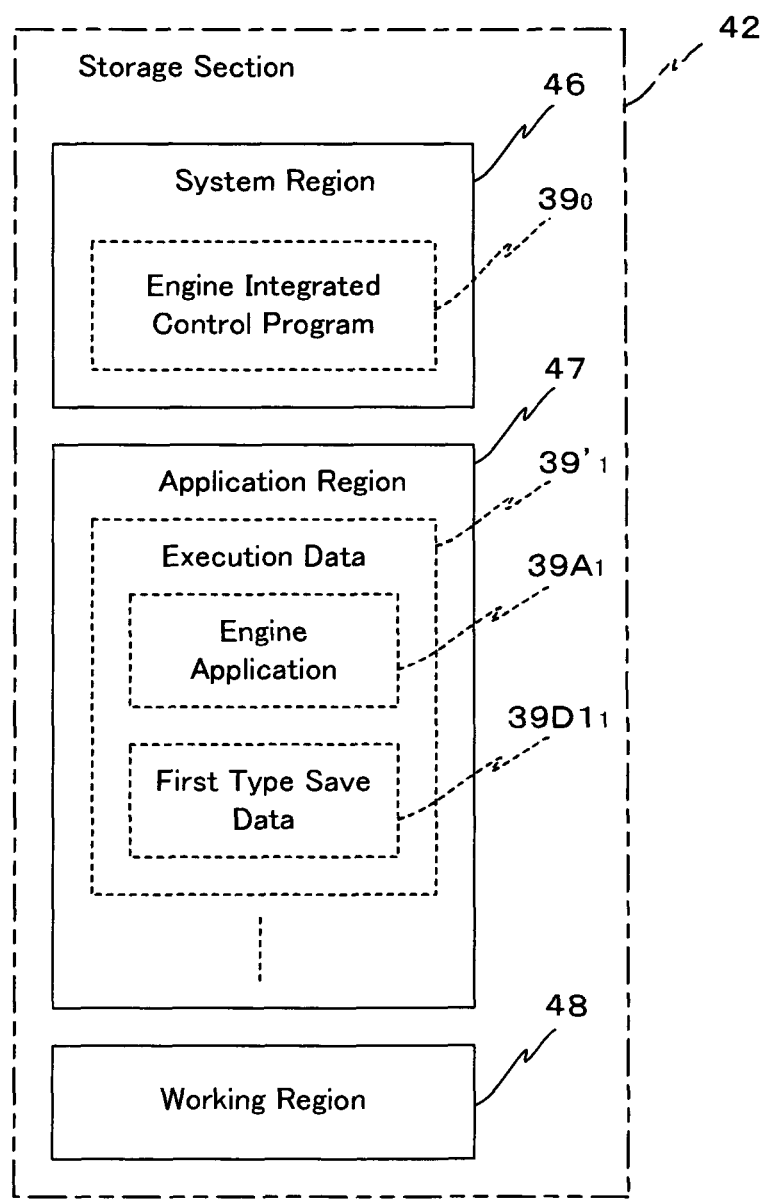
FIG. 5 is drawing for describing the structure of the storage section of an engine section in FIG. 2.

It is also possible to store engine application related data in the storage medium MCD. In this case, as shown in FIG. 4, engine application related data $39_{N+1}, \ldots, 39_{N+M}$ is stored in the storage medium MCD in the same format as when stored in the non-volatile region 37.

Note that, in the following description, when the non-volatile region 37 and the storage medium MCD are named generically, they will be termed non-volatile region 37, MCD.

Returning to FIG. 2, the engine section 40 is comprised of an engine processor 41 for integrated control of all of the engine section 40, and a storage section 42 for storing programs executed by the engine processor 41 and data. In this case, the storage section 42 is connected to the engine processor 41. The above described main display section 25M and speaker 26M are also connected to the engine processor 41.

The storage section 42 is constructed using volatile storage elements for which storage content is not guaranteed if supply of operational power is lost. In this case, as shown in FIG. 4, the storage section 42 is provided with a system region 46 for storing the above described engine integrated control program $39_0$, an engine application region 47 for storing at least one engine application execution data $39'_K$ made up of the above described engine application $39A_k$ (K=any of 1~N+M) and first type save data $39D1_K$, and a working region 48 used by the engine integrated control program $39_0$ and the engine application being executed.

Note that, the engine integrated control program $39_0$ is loaded from the host section 30 to the engine section at the time of initialization of the engine section 40. Also, the engine application $39A_k$ is loaded from the host section 30 to the engine section in response to a user instruction at the time of execution of the engine integrated control program $39_0$ in the engine section 40.

Figure 6:
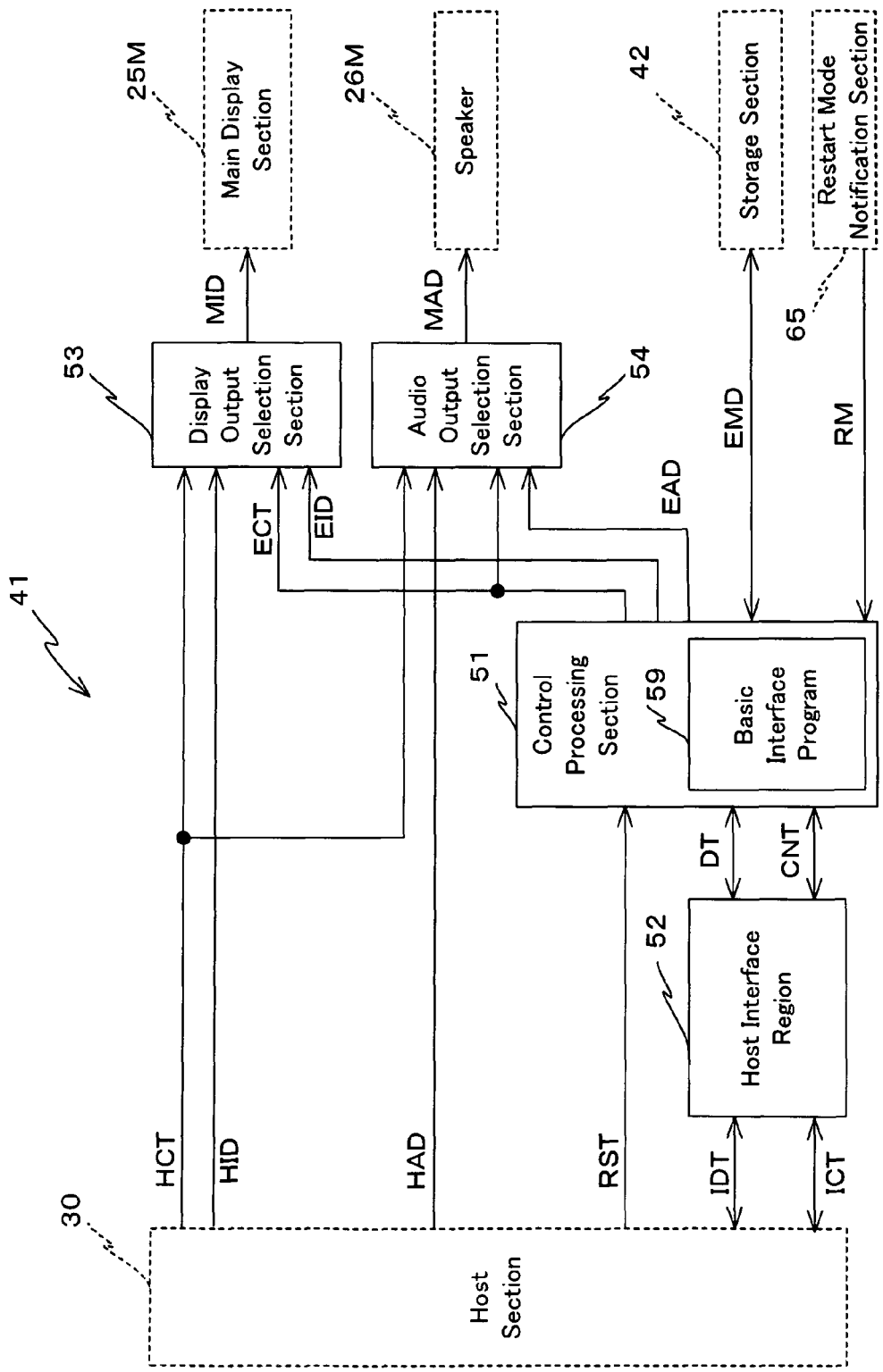
FIG. 6 is block diagram for describing the structure of an engine processor of FIG. 2.

As shown in FIG. 6, the engine processor 41 comprises a control processing section 51 and a host interface section 52.

In addition, the engine processor 41 comprises a display output selection section 53 for selecting either of a host display image signal HID from the host section 30 or an engine display image signal EID from the control processing section 51 and supplying to the main display section 25M as a display image signal MID to be supplied to the main display section 25M. The engine processor 41 further comprises an audio output selection section 54 for selecting either of a host audio signal HAD from the host section 30 or an engine audio signal EAD from the control processing section 51 and supplying to the speaker 26M as an audio signal MAD to be supplied to the speaker 26M.

A basic interface section 59 for controlling operation of the engine section 40, including an interface operation in between the host section 30, is incorporated into the control processing section 51 at a stage before commencement of execution of the above described engine integrated control program $39_0$. Also, the control processing section 51 has a three dimensional graphics processing function and an audio generation processing function, and the three dimensional graphics processing function and audio generation processing function are utilized when executing any of the above-described engine applications $39A_1$, $39A_2$, . . . .

The host interface section 52 is positioned between the host section 30 and the control processing section 51, and performs buffering of various commands and various data interchanged with the host section 30, and mediates various control signals. This host interface section 52 has dual port RAM (Random Access Memory) elements.

At the host interface section 52, the control processing section 51 is connected to one of the dual port RAM elements using an internal data signal DT and an internal control signal CNT. In this case, the internal control signal CNT includes an instruction signal for internal read out from the dual port RAM and an instruction signal for internal write to the dual port RAM, issued by the control processing section 51 to the host interface section 52. The internal control signal CNT also contains an internal interrupt signal indicating that data has been transmitted from the host section 30 to the engine section 40, issued by the host interface section 52 to the control processing section 51.

Also, at the host interface section 52, the host section 30 is connected to the other port of the dual port RAM element using, for example, an 8-bit parallel interface data signal IDT and an interface control signal ICT. In this case, the interface control signal ICT includes an instruction signal for interface read out from the dual port RAM and an instruction signal for interface write to the dual port RAM, issued by the host section 30 to the host interface section 52. The interface control signal ICT also contains an interface interrupt signal indicating that data has been transmitted from the engine section 40 to the host section 30, issued by the host interface section 52 to the host section 30.

By exchanging the above-described signals, it becomes possible to interchange instructions and responses accompanying attached data, as required, between the host section 30 and the engine section 40 via the host interface section 52.

At the display output selection section 53, one of the host display image signal HID and the engine display image signal EID is selected and output as a display image signal MID depending on designation by the host output control signal HCT from the host section 30 and an engine output control signal ECT from the control processing section 51, as follows. In this case, when priority display of a host image is designated by the host output control signal HCT, the display output selection section 53 selects the host display image signal HID and outputs it as the display image signal MID regardless of designation by the engine output control signal ECT. On the other hand, when priority display of a host image is not designated by the host output control signal HCT, the display output selection section 53 selects one of the host display image signal HID and the engine display image signal EID for output as the display image signal MID in accordance with designation by the engine output control signal ECT.

That is, at the display output selection section 53, when priority display of a host image has not been designated by the host output control signal HCT and display of an engine image has been designated by the engine output control signal ECT, the engine display image signal EID is selected and output as the display image signal MID. Also, at the display output selection section 53, when priority display of a host image has not been designated by the host output control signal HCT and display of an engine image has not been designated by the engine output control signal ECT, the display output selection section 53 selects the host display image signal HID and outputs it as the display image signal MID.

At the audio output selection section 54, similarly to the display output selection section 53, one of the host audio signal HAD and the engine audio signal EAD is selected and output as an audio signal MAD depending on designation by the host output control signal HCT and the engine output control signal ECT. That is, when priority output of a host audio is designated by the host output control signal HCT, the audio output selection section 54 selects the host audio signal HAD and outputs it as the audio signal MAD regardless of designation by the engine output control signal ECT. Also, when priority output of host audio has not been designated by the host output control signal HCT and engine application audio output has been designated by the engine output control signal ECT, the audio output selection section 54 selects the engine audio signal EAD and outputs it as the audio signal MAD. Also, when priority output of host audio has not been designated by the host output control signal HCT and engine application audio output has not been designated by the engine output control signal ECT, the audio output selection section 54 selects the host audio signal HAD and outputs it as the audio signal MAD.

The above-described power supply control section 62 respectively and independently controls supply of operating power PWW to the engine processor 41 of the engine section 40 and supply of operating power MPW to the storage section 42 of the engine section 40 in accordance with a power supply control signal instruction PSC from the host section 30. That is, the above-described power supply control section 62 perform ON/OFF switching of the operational power supply PPW upon receipt of ON/OFF designation for the operational power supply PPW of the engine processor 41 from the host section 30. The above-described power supply control section 62 also performs ON/OFF switching of the operational power supply MPW upon receipt of ON/OFF designation for the operational power supply MPW of the storage section 42 from the host section 30.

Note that in control of supply of operational power to the engine section 40 by the host section 30 and the power supply control section 62, operational power PPW is supplied to the engine processor 41, but in such a manner that a state where operational power MPW is not supplied to the storage section 42 is avoided. Also, in the power supply control section 62, if supply of electrical power to the power supply control section 62 from the power supply 61 is started, a state is entered where both the operational power PPW to the engine processor 41 and operational power MPW to the storage section 42 are off. This state is maintained until receipt of a power supply control instruction PSC indicating that at least one of the operational power PPW to the engine processor 41 and operational power MPW to the storage section 42 is ON.

Restart modes for processing in the engine section when commencing or restarting operational power to the engine processor 41 are restart information usage mode or initialization mode. In the case of restart information usage mode, processing of the engine section is restarted from a state at the time when operational power to the engine processor 41 stopped the previous time, using restart information saved in the storage section 42 of the engine section 40. Use of this restart information usage mode can be used only in the case where supply of operational power to the storage section 42 is maintained, even if operation power to the engine processor 41 is stopped the previous time.

Also, in the case of initialization mode, processing of the engine section 40 commences from initialization processing, regardless of whether or not thee is restart information in the storage section 42. This restart information usage mode can be used regardless of whether or not there was supply of operational power to the storage section 42 at the time of stopping operational power to the engine processor 41 the last time.

Which of the above described two restart modes is to be used by the engine section 40 is instructed by using a restart mode setting instruction RMS to the restart mode notification section 65. The restart mode notification section 65 that has received this restart mode setting instruction RMS notifies the instructed restart mode to the engine section 40 using a restart mode notification RM. This notification is carried out by setting of a voltage level of a signal line carrying the restart mode notification RM by the restart mode notification section 65.

Figure 7:
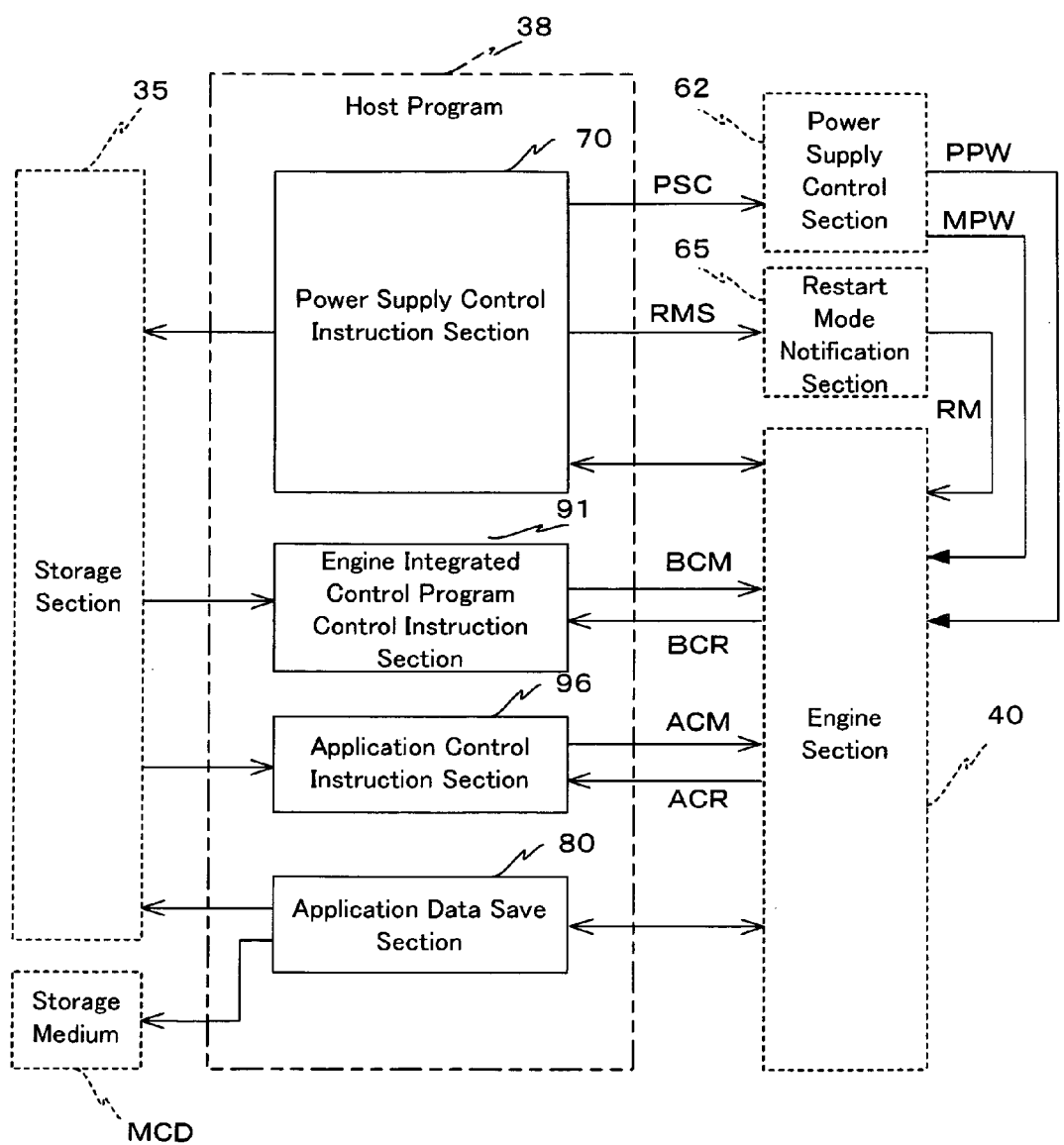
FIG. 7 is block diagram for describing the structure of a host program of FIG. 3.

As shown in FIG. 7, the above described host program 38 comprises a power supply control instruction section 70, an application data save section 80, an engine integrated control program control section 91 and an application control instruction section 96. In addition to the above described elements 70, 80, 91 and 96, the host program 38 further includes a plurality of program modules that are not shown in the drawings, performing functions such as communication functions, and also managing the elements 70, 80, 91 and 96.

Figure 8:
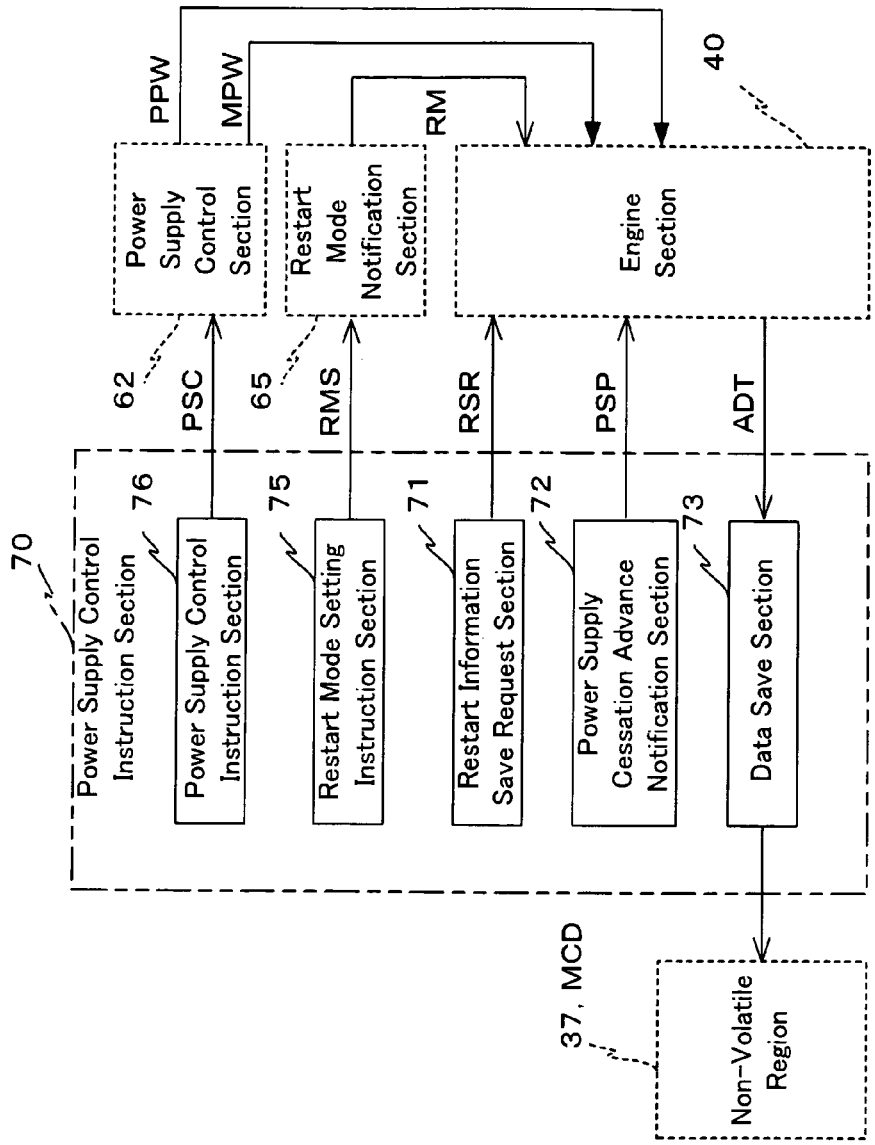
FIG. 8 is block diagram for describing the structure of a power supply control instruction section of FIG. 7.

In this case, as shown in FIG. 8, the power supply control instruction section 70 comprises (i) a restart information save request section 71 for transmitting a restart information save request RSR to the engine section 40 before stopping supply of operating power PPW to the engine processor 41, (ii) a power supply stop advance notification section 72 for transmitting a power supply stop advance notification PSP to the engine section 40 before stopping supply of operating power PPW to the engine processor 41 and operating power MPW of the storage section 42, and (iii) a data save section 73 for saving application restart information ADT, returned in response to the power supply stop advance notification PSP, in the storage section 35. Note that, the data save section 73 saves received application restart information ADT to the non-volatile region 37 of the storage section 35.

Also, the power supply control instruction section 70 comprises (v) a restart mode setting instruction section 75 for transmitting a restart mode setting instruction RMS to the restart mode notification section 65 and (vi) a power supply control instruction section 76 for transmitting a power supply control instruction PSC to the power supply control section 62.

Figure 9:
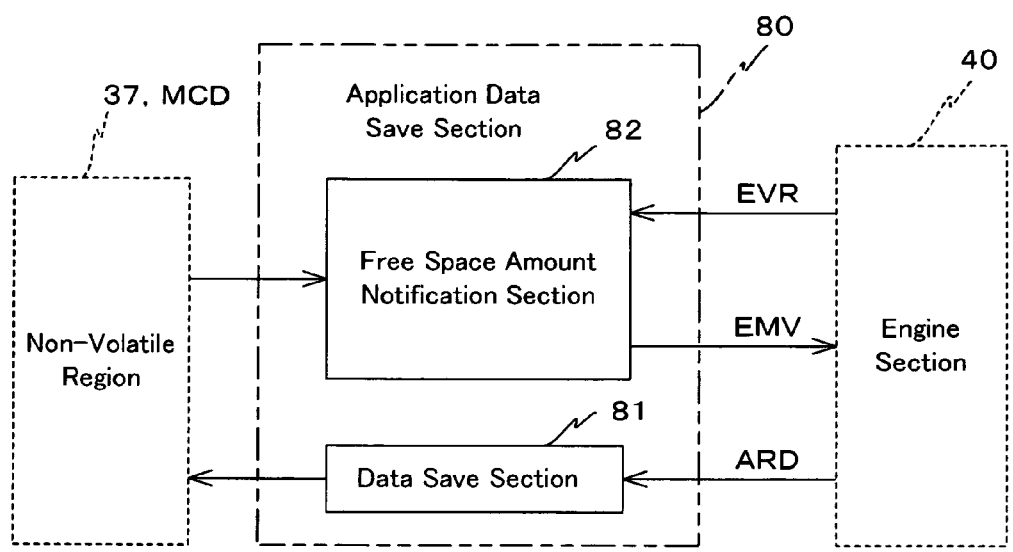
FIG. 9 is block diagram for describing the structure of an application data save section of FIG. 7.

As shown in FIG. 9, the above-described application save section 80 comprises a data save section 81 and a free space notification section 82. In this case, the data save section 81 receives a data save request ARD, together with an engine application identifier, data type identifier for save data (identifier representing whether save data belongs to first type save data or second type save data), and save data, from the engine section, and save data is stored in a storage region specified by the engine application identifier and the data type identifier of the save data. Note that, when engine application $39A_k$ (K=any of 1~N+M) is specified by the engine application identifier and i type save data (i=either 1 or 2) is specified by the data type identifier for the save data, a storage region specified by the engine application identifier and the data type identifier if the save data is made a storage region for i type data region $39Di_K$.

Also, the free space notification section 82 receives a free space enquiry EVR from the engine section 40 containing an engine application identifier and a data type identifier, and free space for a storage region specified by the engine application identifier and data type identifier is examined. The free space notification section 82 then notifies an obtained free space value EMV to the engine section 40 as a result of the examination. Note that, the engine application identifier and data type identifier included with the free space enquiry are included in this notification.

Returning to FIG. 7, the engine integrated control program control instruction section 91 transmits an initial program load command and an engine integrated control program $39_O$ execution commencement command, accompanying the engine integrated control program $39_O$ read out from the storage section 35, to the engine section 40. The engine integrated control program control instruction section 91 then receives responses to these commands from the engine section 40.

The application control instruction section 96 transmits an application load command and control commands relating to operation of the engine application $39A_k$ that accompany the engine application $39A_k$ (and, when required, first type data) read out from the storage section 35 or the storage medium MCD, to the engine section 40. The application control instruction section 96 then receives responses to these commands from the engine section 40.

Figure 10:
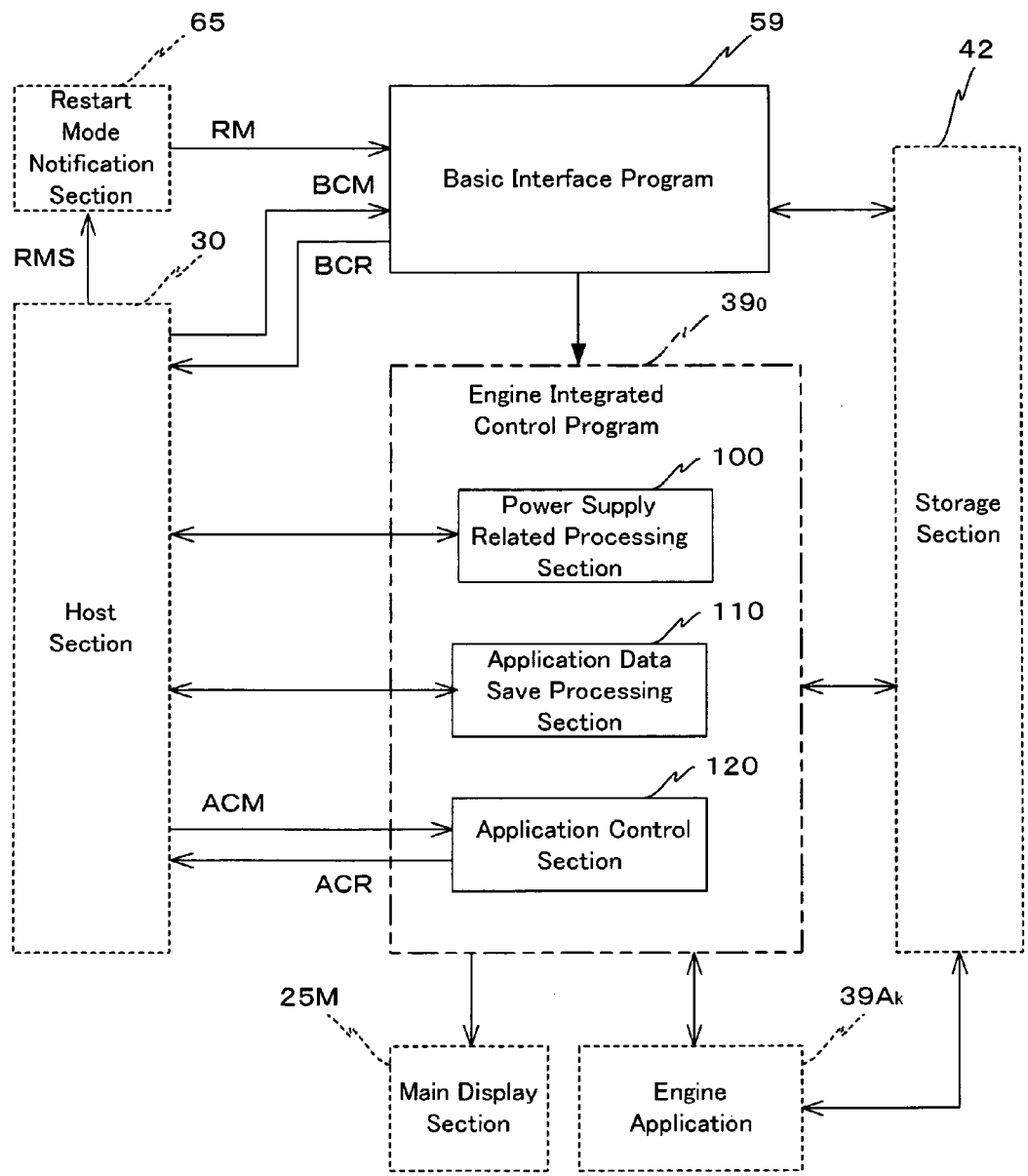
FIG. 10 is block diagram for describing the structure of an engine integrated control program of FIG. 3.

As shown in FIG. 10, the above described engine integrated control program $39_O$ comprises a power supply related processing section 100, an application data save processing section 110, and an application control section 120. Note that in addition to the above described elements 100, 110 and 120, the engine integrated control program $39_O$ further comprises a plurality of program modules that are not shown in the drawings, performing functions such as functions of the engine section 40, and also managing the elements 100, 110 and 120.

Figure 11:
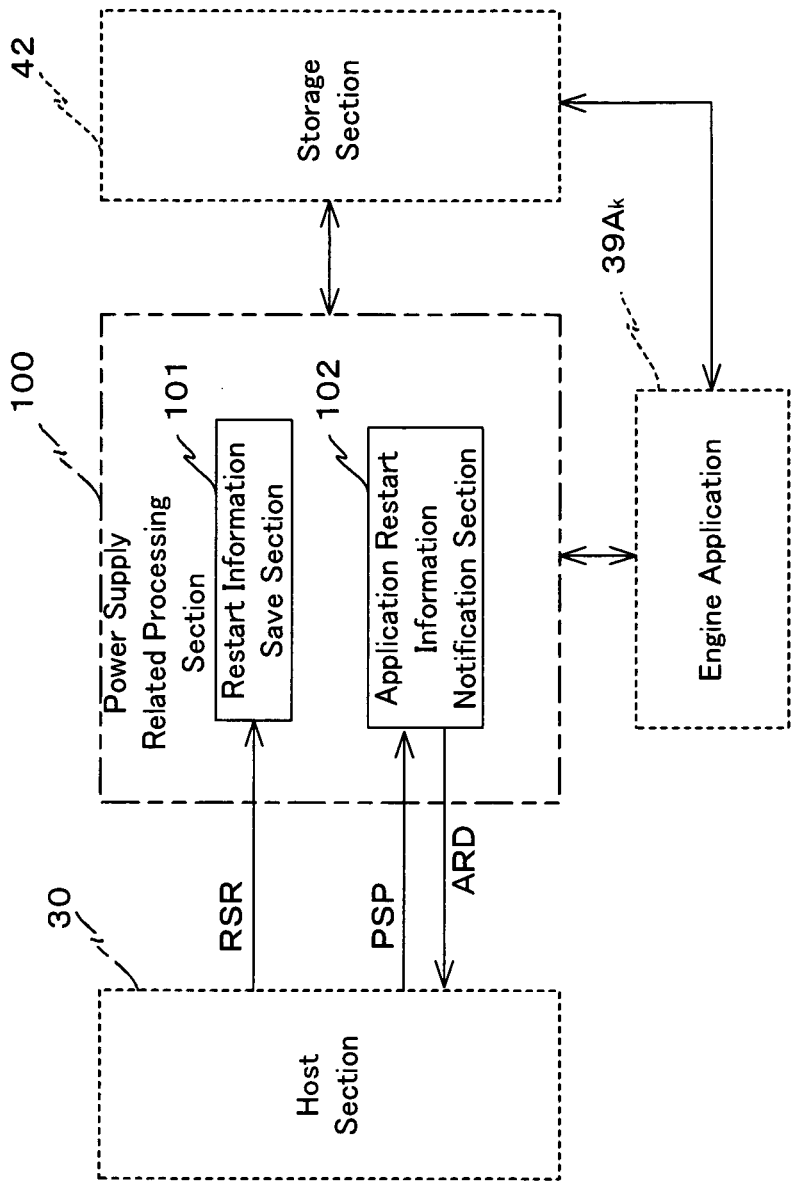
FIG. 11 is block diagram for describing the structure of a power supply related processing section of FIG. 10.

In this case, as shown in FIG. 11, the power supply related processing section 100 comprises (i) a restart information save section 101 for saving restart information in the storage section 42 when a restart information save request RSR is received from the host section 30, and (ii) an application restart information notification section 102 for returning application restart information ARD to the host section 30 when a power supply stop advance notification PSP is received from the host section 30.

Figure 12:
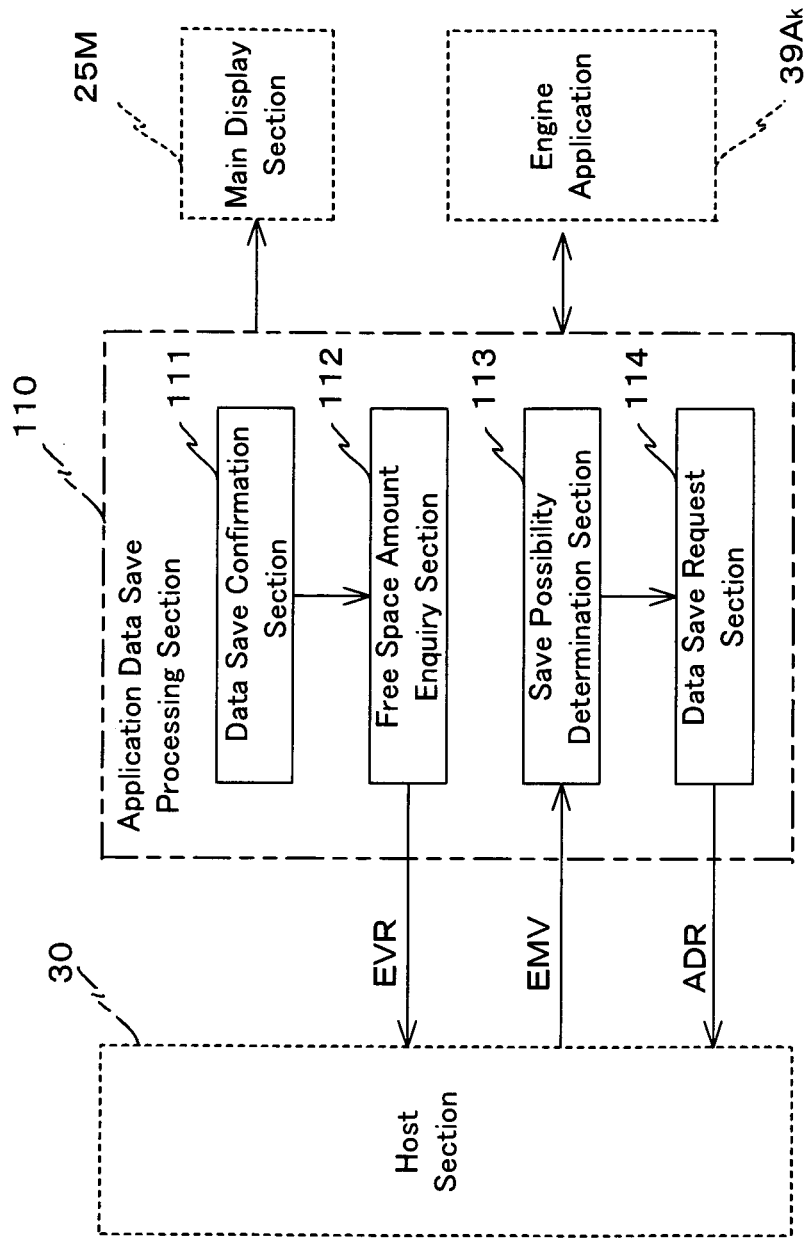
FIG. 12 is block diagram for describing the structure of an application data save processing section of FIG. 10.

As shown in FIG. 12, the above-described application data save processing section 110 comprises a data save confirmation section 111, a free space enquiry section 112, a save possibility determination section 113 and a data save request section 114. In this case, the data save confirmation section 111 displays a save confirmation image on the main display section 25M, by means of the display output selection section 53, when there is candidate data for saving to host section 30 relating to an engine application that is being executed or is temporarily stopped. If a user looking at this save confirmation display performs key input from the operation section for save confirmation or save abort, the data save confirmation section 111 receives that key input data via the host section 30. Next, when the received key input data represents save confirmation, the fact that a save operation should be started, an identifier for an application relating to the save candidate data and specific information for the save candidate data are notified to the free space enquiry section 112.

The free space enquiry section 112 transmits the above described free space enquiry EVR to the host section 30 upon receipt of indication that a save operation should be started, an identifier for a related engine application and specific information for the save candidate data from the data save confirmation section 111. Note that, the free space enquiry section 112 determines whether save candidate data belongs to first type save data or second type save data based on specific information for the save candidate data. From the result of this determination, a data type identifier to be attached to the free space enquiry EVR is derived.

This save possibility determination section 113 receives the above described free space value EMV returned from the host section 30 in response to the free space enquiry. Continuing on, the save possibility determination section 113 determines whether or not it is possible to save the save candidate data in the host section 30 at the current point in time based on the received free space value EMV. When the result of this determination is affirmative, indication of this fact, and indication of the fact that the save candidate data is save data, are notified to the data save request section 114.

The data save request section 114 transmits the above mentioned data save request to the host section 30 upon receipt of notification from the save possibility determination section 113.

[Operation]

Next, description will be given focusing on coordination operation between the host section 30 and the engine section 40 in a mobile telephone unit constructed as described above.

<Operation When Turning Device Power ON>

Figure 13:
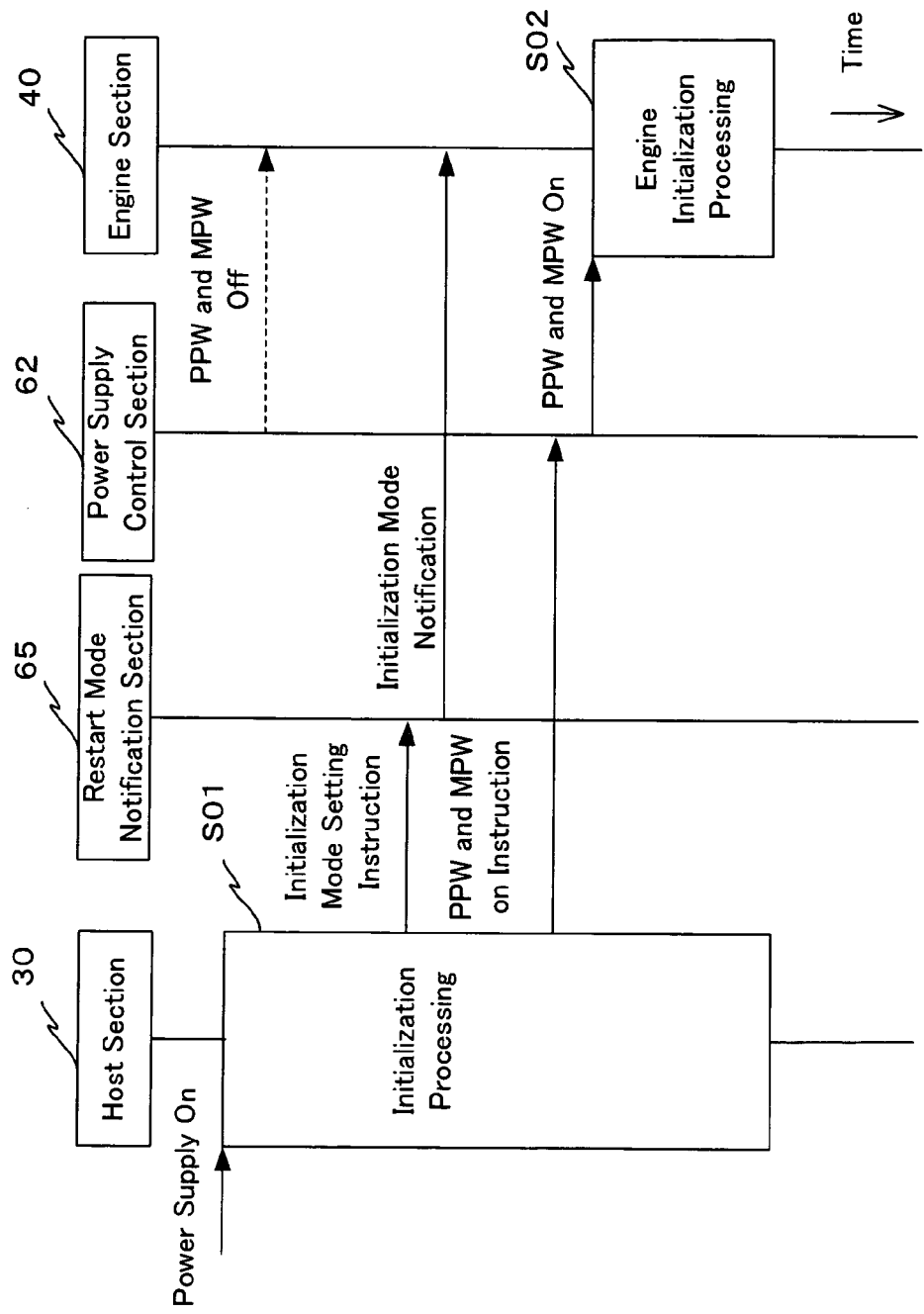
FIG. 13 is a sequence diagram for explaining processing at the time of power up.

As shown in FIG. 13, in a state where the power supply of the mobile telephone unit 10 is OFF, if the user operates a power supply key of the operating section 21 to perform a power supply ON command, supply of power from the power supply section 61 commences. As a result, supply of operational power to sections except the engine section 40 commences.

If supply of operational power to the host section 30 commences in this manner, execution of a host program 38 commences in the host section 30. If execution of the host program 38 commences, then in the host section 30, first of all initialization processing is executed in step S01. In this initialization processing, the host section 30 performs initialization of the volatile region 36 of the storage section 35, and of the wireless communication section 32, and also designates priority output of host images and host audio using a host output control signal HCT, and places the main display section 25M and the speaker 26M under the control of the host section 30. The host section 30 then carries out initialization of devices that are under the control of the host processor 31, as required.

Also, in the initialization processing the restart mode-setting instruction section 75 of the host section 30 sends an instruction, to the effect that initialization mode notification should be performed to the engine section 40, to the restart mode notification section 65 using a restart mode setting instruction RMS. In this case, "initialization mode notification" is notification of the fact that the engine section 40 should execute from initialization, when supply of operating power to the engine processor 41 has commenced. The restart mode notification section 65 that has received the initialization mode notification instruction performs initialization mode notification to the engine section 40 as a restart mode notification RM.

In a state where this initialization mode notification is being carried out, the power supply control instruction section 76 of the host section 30 sends an instruction to turn on operational power PPW to the engine processor 41 and operating power MPW to the storage section 42 to the power supply control section 62 as a power supply control instruction PSC. The power supply control section 62 that has received this instruction commences supply of operational power PPW operational power MPW to the engine section 40.

Once supply of operating power PPW and operating power MPW has started, execution of the basic interface program 59 is started in the engine section 40. Once execution of the basic interface program 59 starts, at the engine section 40, first of all the basic interface program 59 refers to a restart mode notification RM and determines whether initialization mode or restart information usage mode is being designated as a process restart mode. At this stage, since initialization mode is designated as the restart mode, initial processing of the engine section 40 is carried out in step S02. In the initialization processing of the engine section 40, non-output of an engine image and engine audio is designated using an engine output control signal ECT.

<Normal Operational Control of the Engine Section by the Host Section after Initialization>

Next, description will be given for normal control operation of the engine section by the host section after initialization, focusing on state transition of the engine section 40.

In this case, definition of each state of the engine section 40 shown in the state transition diagram of FIG. 14 will be described. An idle state S1 is a state where the above described basic interface program 59 is being executed in the control processing section 51. Also, a ready state S2 is a state where the above described engine integrated control program $39_0$ is being executed in the control processing section 51, and no applications whatsoever are stored in the application region 47 of the storage section 42. Also, an application loaded state S3 is a state where some applications are stored in the application region 47 of the storage section 42, and none of the applications are being executed or temporarily stopped. An application operation state S4 is a state where at least one of the applications stored in the application region 47 of the storage section 42 is being executed. An application temporarily stopped state S5 is a state where at least one of the applications is temporarily stopped, no applications whatsoever are being executed.

As mentioned above, if the engine unit 40 is initialized by turning the power supply of the mobile telephone unit 10 on, the idle state S1 is entered, as shown in FIG. 6. Also, in a state where the host section 30 as designated initialization mode as the restart mode of the engine section 40, at the engine section 40 an initialization operation is carried out even if a reset command signal RST has been generated from the host section 30, and the idle state S1 is entered.

Note that, the engine section 40 does not operate at the time of initialization accompanying power ON until initialization is performed up to contents of the storage section 42. This is because the whole of the storage section 42 is a volatile region, and so the storage contents are indefinite.

(1) Initial Load Processing

After the above-described initialization of the engine section 40 has been carried out, initial load processing from loading of the engine integrated control program $39_0$ to the engine section 40 until commencement of execution is carried out in accordance with the procedure shown in FIG. 7.

Note that, after initializations of the engine section 40 accompanying power ON, initial load processing starts automatically. On the other hand, after initialization of the engine section 40 accompanying generation of a reset instruction signal RST from the host section 30, initial load processing is started in response to an initial load processing instruction resulting from operation of the operating section 21 by the user.

As shown in FIG. 7, in the initial load processing, first of all the engine integrated control program control instruction section 91 of the host section 30 sends an initial program load command, to make the engine integrated control program $39_0$ attached data, to the engine section 40. When transmitting this initial program load command, the engine integrated control program control instruction section 91 reads out the engine integrated control program $39_0$ from the non-volatile region 37 of the storage section 35. The engine integrated control program control instruction section 91 then sends the initial program load command, for making the engine integrated control program $39_0$ attached data, to the engine section 40.

At the engine section 40, the basic interface program 49 receives the initial program load command. The basic interface program 49 that has received this command stores the engine integrated control program $39_0$, that has been transmitted from the host section 30 as attached data of the initial program load command, in the system region 46 of the storage section 42. In this way, once storing of the engine integrated control program $39_0$ in the storage section 42 is completed, the basic interface program 49 transmits a load complete notification for the engine integrated control program $39_0$ to the host section 30.

In the host section 30, the load complete notification for the engine integrated control program $39_0$ is received by the engine integrated control program control instruction section 91. The engine integrated control program control instruction section 91 that has received this notification transmits an execution commencement command, for the engine integrated control program $39_0$ that has no attached data, to the engine section 40.

At the engine section 40, the basic interface program 49 receives the execution commencement command for the engine integrated control program $39_0$. The basic interface program 49 that has received this command this way causes execution of the engine integrated control program $39_0$ to start, and transmits an execution commencement notification for the engine integrated control program $39_0$ to the host section 30.

In the host section 30, the execution commencement notification for the engine integrated control program $39_0$ is received by the engine integrated control program control instruction section 91.

In this way, the initial load processing is completed. If execution of the engine integrated control program $39_0$ in the engine section is started as a result of the initial load processing, the state of the engine section 40 makes a transition from the idle state S1 to the ready state S2, as shown in FIG. 14. In this ready state S2, control and processing are carried out by execution of the engine integrated control program $39_0$ that has a lot of functions compared with the basic interface program.

Note that, if initial load processing is complete, the host section 30 cancels the priority output designation for host image and host audio using a signal level of the host output control signal HCT. On the other hand, in the engine section 40, a state where output designation for engine image and engine audio is not carried out using the engine output control signal ECT is maintained. As a result, similarly to when the engine section 40 is in the idle state S1, when the engine section 40 is in the ready state S2 also, the main display section 25M and the speaker 26M are subject to control by the host section 30.

Also, in the initial load processing, in the event that a response to the command from the host section 30 is not returned from the engine section 40 and the host section 30 detects a timeout error, the host section 30 performs a reset instruction for the engine section 40 by temporarily making the signal level of the reset instruction signal RST a significant level. The host section 30 then tries the above-described initial load processing again. If even when trying this the initial load processing again, a response to the command from the host section 30 is not returned from the engine section 40 and the host section 30 detects a timeout error, the host section 30 displays an indication that there is no response from the engine section 40 on the main display section 25M, and notifies the user.

Also, in the event that in the initial load processing there is not a normal response as described above from the engine section 40 to the command from the host section 30 and an error response is returned, the command that elicited the error response is notified to the engine section again. If there is also an error response to this re-notification of the command, the host section 30 performs a reset command for the engine section 40 by temporarily making the signal level of the reset instruction signal RST a significant level. The host section 30 then tries the above-described initial load processing again. If when trying this the initial load processing again an error response is returned from the engine section 40 to the command from the host section 30, or no response is returned, the host section 30 displays an indication that there is an error response from the engine section 40, or an indication that there is no response from the engine section 40, on the main display section 25M, and notifies the user.

Note that, if execution of a process having a higher priority than the initial load process is requested to the host section 30 as a result of a specified instruction due to the user operating the operating section 21 midway through the initial load processing, the host section 30 stops the initial load processing and issues a reset command signal RST to the engine section 40. As a result, the engine section 40 is initialized.

(2) Load Processing for Engine Application

Figure 16:
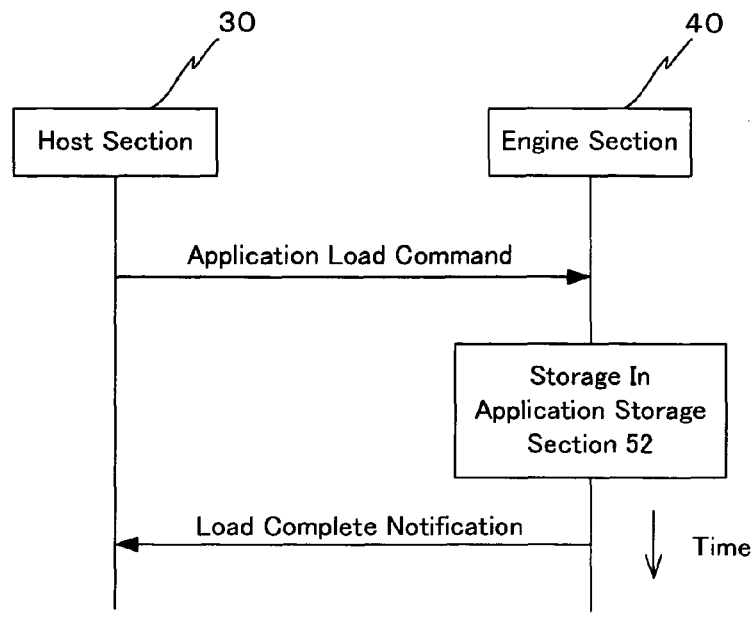
FIG. 16 is a sequence chart for describing application load processing.

After normal completion of the above described initial load processing, if a load command for a desired engine application $39A_k$ (k=1, 2 . . . ) is initiated by the user operating the operating section 21, load processing for the engine application $39A_k$ from the host section 30 to the engine section 40 is carried out in accordance with the sequence shown in FIG. 16.

Figure 14:
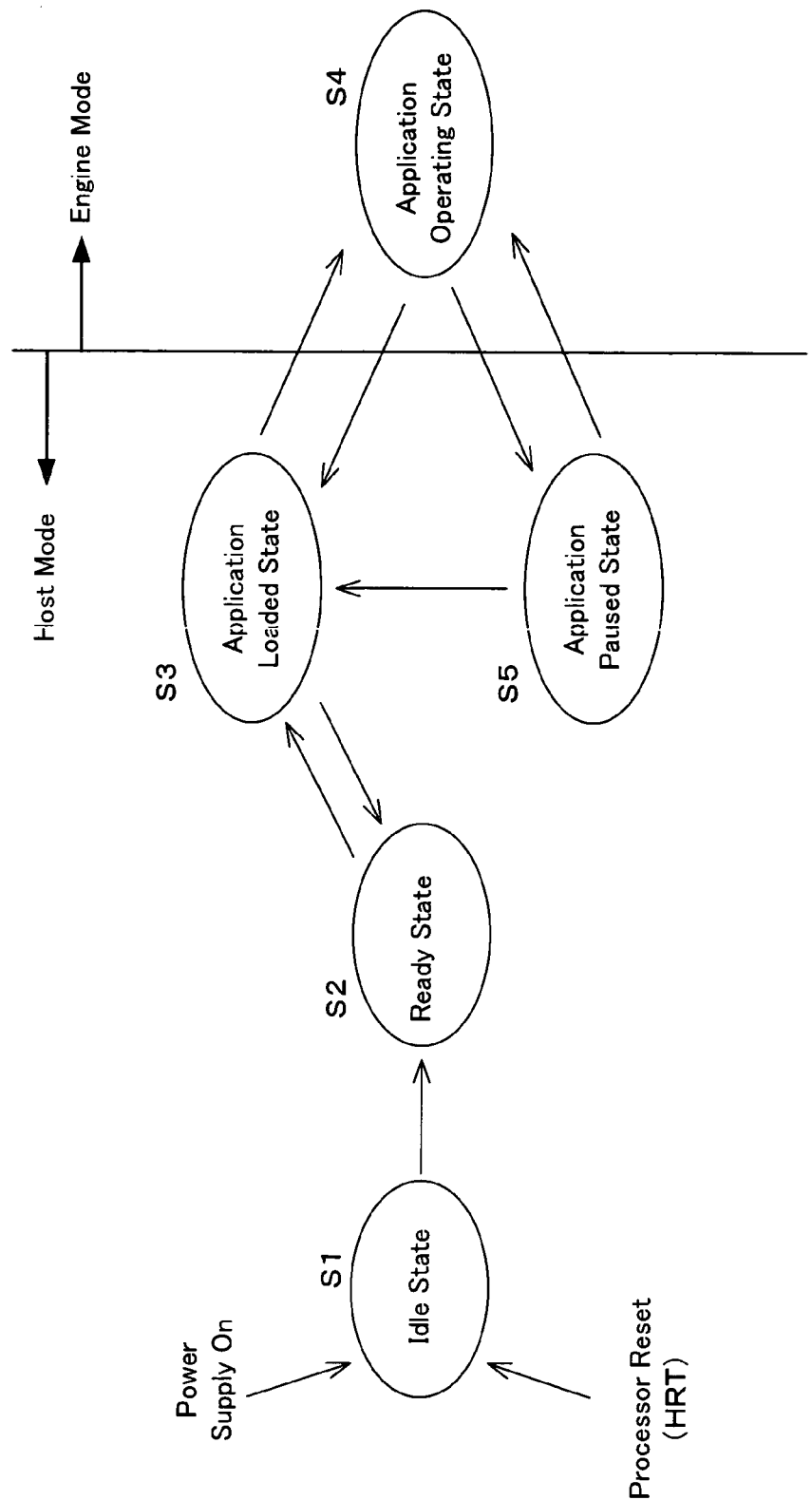
FIG. 14 is state transition diagram for describing state transitions of the engine section of FIG. 2.
Figure 15:
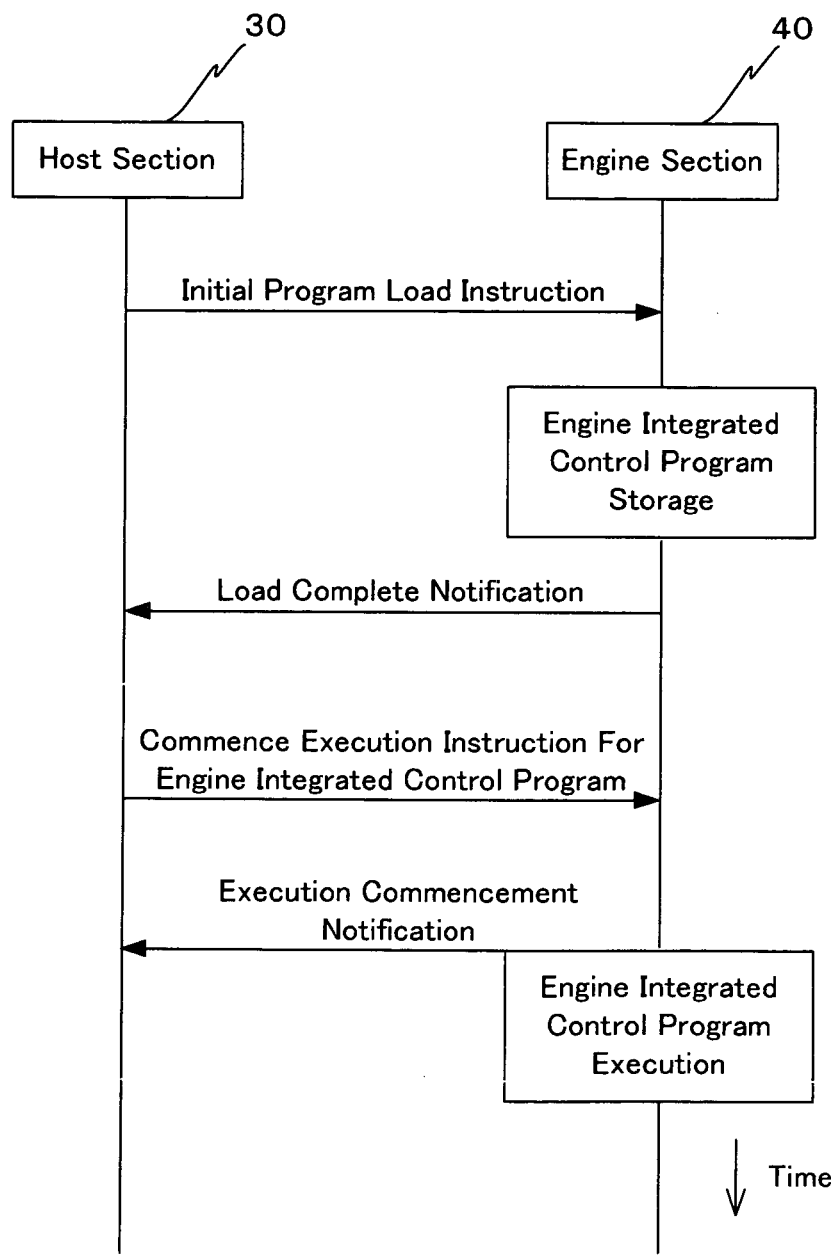
FIG. 15 is a sequence chart for describing initial load processing.

Note that, with this embodiment the application load processing is not carried out in the application operation state S4 (refer to FIG. 14). It is also possible for the number of application that can be stored in the application region 47 of the storage section 42 of the engine section 40 to be one, or to be two or more. With this embodiment, description will be given in the following for a situation where the number of applications that can be stored in the application region 47 is numerous (for example, 2).

This application load processing involves the application control instruction section 96 at the host section 30 side and involves the application control section 120 at the engine section 40 side, and is carried out in the same manner as the above described initial program load processing, except for storing of the engine application $39A_k$ in the application region 47 of the storage section 42. That is, an application load command for making the engine application $39A_k$ (and if required, first type save data $39D1_k$) attached data is transmitted from the host section 30 to the engine section 40. At the engine section 40 that has received the application load command, attached data is stored in the application region 47 of the storage section 42. In this way, once storing of the engine application $39A_k$ in the storage section 42 is completed, the engine section 40 transmits a load complete notification for the engine application $39A_k$ to the host section 30.

In a state where load processing for the above-described engine application $39A_k$ has not stored any application in the application region 47 of the storage section 42, that is, when the ready state S2 has been performed, upon completion of the load processing for the engine application $39A_k$, as shown in FIG. 14, the state of the engine section 40 makes a transition to the application loaded state S3 from the ready state S2. Conversely, in the event that the state where the load processing for the engine application $39A_k$ has stored an application in the application region 47 of the storage section 42 has been performed, a state transition does not occur for the engine section 40. That is, in the event that there has been load processing for the engine application $39A_k$ in the application loaded state S3, the application loaded state S3 is maintained as the state of the engine section 40. Also, in the event that there has been load processing for the engine application $39A_k$ in the application temporarily stopped state S5, the application temporarily stopped state S5 is maintained as the state of the engine section 40.

In the application loaded state S3, in the engine section 40 the signal level of the engine output control signal ECT is set to a non-significant level. As a result, similarly to when the engine section 40 is in the above mentioned idle state S1 and the ready state S2, the main display section 25M and the speaker 26M are subject to control by the host section 30.

(3) Unload Processing for Engine Application

Figure 17:
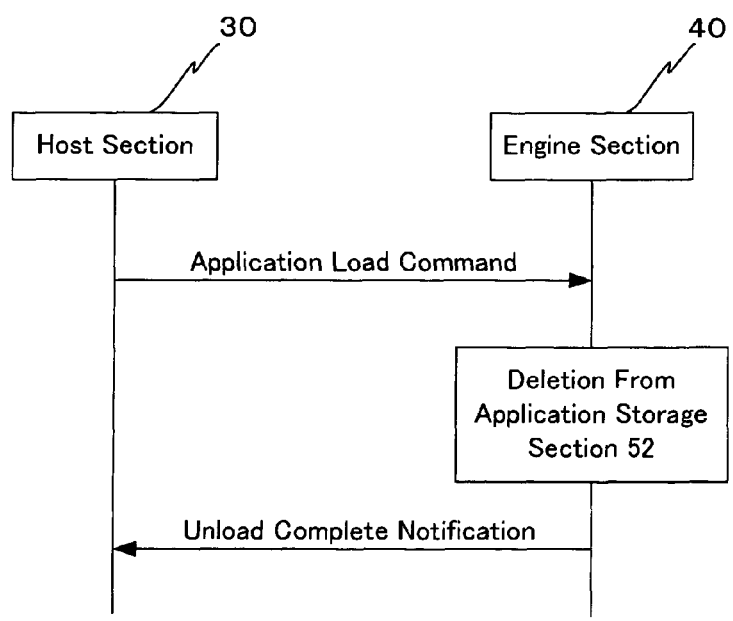
FIG. 17 is a sequence chart for describing application unload processing.

The engine application $39A_k$ (and, when it exists, first type save data $39D1_k$) that has been loaded to the engine section 40 as described above can be unloaded according to the procedure shown in FIG. 17.

Unload processing for the engine application $39A_k$ is carried out in response to an unload instruction for the desired engine application $39A_k$ as a result of the operator operating the operation section 21. Note that, with this embodiment the application unload processing is not carried out in the application operation state S4 (refer to FIG. 14).

With this application unload processing, first of all the host section 30 transmits an application unload command, with an identifier of the engine application $39A_k$ as attached data, to the engine section 40, similarly to the case of the above described application load command. At the engine section 40, the application control section 120 receives the application unload command. The application control section 120 that has received this application unload command deletes the engine application program $39A_k$ from the application storage region 47 of the storage section 42. In this way, once deletion of the engine application program $38A_k$ from the storage section 42 is completed, the application control section 120 notifies an unload complete notification for the engine application program $39A_k$ to the host section 30.

If the above-described unload processing for the engine application $39A_k$ has been carried out in the application loaded state S3 and a state where no application is stored in the application region 47 of the storage section 42, the state of the engine section 40 makes a transition from the application loaded state S3 to the ready state S2, as shown in FIG. 14. Conversely, in the event that the state where an application is stored in the application region 47 of the storage section 42 even if the unload processing for the engine application $39A_k$ has been completed, a state transition does not occur for the engine section 40. That is, in the event that there is a state where the unload processing for the engine application $39A_k$ has been executed in the application loaded state S3 but an application is stored in the application region 47 of the storage section 42, the application loaded state S3 is maintained as the state of the engine section 40. Also, in the event that there has been load processing for the engine application $39A_k$ in the application temporarily stopped state S5, the application temporarily stopped state S5 is maintained as the state of the engine section 40. Note that, it is not possible to unload a temporarily stopped application in the application temporarily stopped state S5.

(4) Engine Application Execution Commencement Processing

Figure 18:
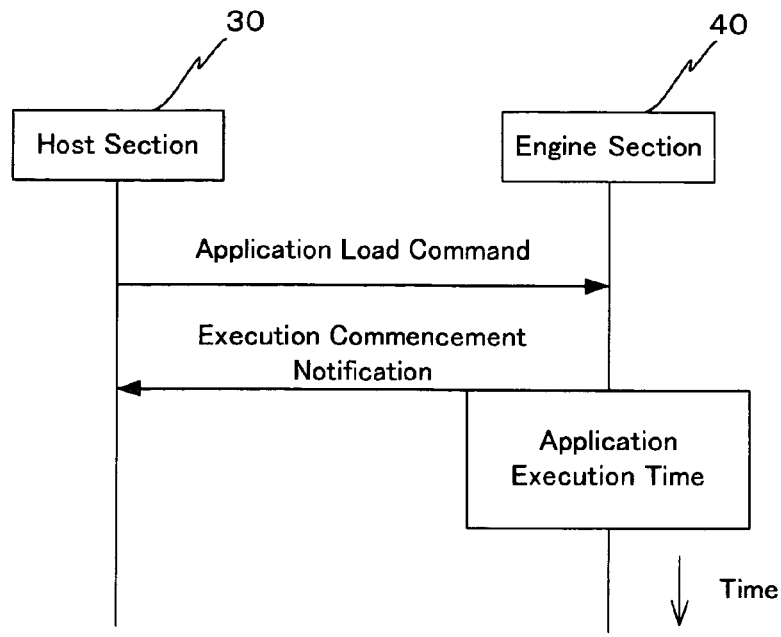
FIG. 18 is a sequence chart for describing application execution commencement processing.
Figure 19:
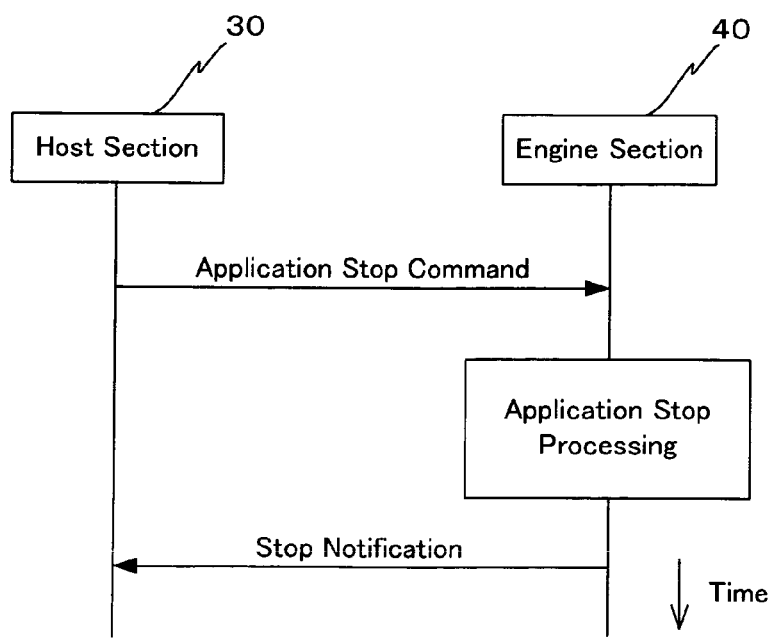
FIG. 19 is a sequence chart for describing application stop processing.

Execution commencement for the above-described engine application $39A_k$ is carried out using the procedure shown in FIG. 18 when the engine application $39A_k$ is stored in the application region 47 of the storage section 42 and is not being executed. Note that, execution commencement processing for the engine application $39A_k$ is carried out in response to an execution commencement instruction for the engine application $39A_k$ as a result of the operator operating the operation section 21.

In this application execution commencement processing, first of all the host section 30 transmits an application execution commencement command, with an identifier of the engine application $39A_k$ (and, if required, first type save data $39D1_k$) as attached data, to the engine section 40, similarly to the case of the above described application unload command. At the engine section 40, the application control section 120 receives the application execution commencement command. The application control section 120 that has received this execution commencement command causes execution of the engine application $39A_k$ to start, and transmits an execution commencement notification for the engine application $39A_k$ to the host section 30.

The above-described execution commencement processing for the engine application $39A_k$ is carried out when the state of the engine section 40 reaches the application loaded state S3, and when execution of the engine application $39A_k$ has started the state of the engine section 40 makes a transition from the application loaded state S3 to the application operation state S4, as shown in FIG. 14. Also, if execution commencement processing for the engine application $39A_k$ is carried out in the application temporarily stopped state S5, the state of the engine section 40 makes a transition from the application temporarily stopped state S5 to the application operation state S4. On the other hand, in the event that execution commencement processing for the engine application $39A_k$ while the engine section 40 is in the application operation state S4 where another application is already being executed, since the application operation state S4 is already in effect there is no state transition of the engine section 40 even if execution of the engine application $39A_k$ starts.

In the application operation state S4, at the engine section 40, output designation for engine image and engine audio is carried out using an engine output control signal ECT. As a result, in the application operation state S4, the mode is not host mode where the host section 30 controls the main display 25M and speaker 26M, as in states S1 to S3 described above, but engine mode where the engine section 40 controls the main display 25M and speaker 26M.

(5) Engine Application Stop Processing Resulting From User Instruction.

In response to a stop instruction for the engine application 39A; due to the user operating the operating section 21 and so forth, the engine application 39A$_k$ that is being executed or is temporarily stopped because of an application pause command, which will be described later, is stopped using the procedure shown in FIG. 18.

With this application stop processing, first of all the host section 30 transmits an application stop command, with an identifier of the engine application 39A$_k$ as attached data, to the engine section 40, similarly to the case of the execution commencement command for the above mentioned engine integrated control program. At the engine section 40, the application control section 120 receives the stop command. The application control section 120 that has received this stop command causes execution of the engine application 39A$_k$ to stop, and notifies an execution stop notification for the engine application 39A$_k$ to the host section 30.

If execution of the engine application 39A$_k$ is stopped by execution stop processing for the engine application 39A$_k$ that is executing so that there is no longer an application being executed in the engine section 40, and no application that is temporarily stopped, the engine section 40 makes a transition from the application operation state S4 to the application loaded state S3, as shown in FIG. 6A a result, there is a change from engine mode to host mode. Also, when another application is temporarily stopped although it is the application operation state S4, as a result of execution stop processing for the engine application 39A$_k$ there is no longer an application being executed in the engine section 40, and the engine section 40 makes a transition from the application operation state S4 to the application temporarily stopped state S5. On the other hand, in the event that another application is being executed in the engine section 40 even if execution of the engine application 39A$_k$ is temporarily stopped, there is no state transition in the engine section 40 even if execution of the engine application 39A$_k$ is temporarily stopped.

Also, in the application temporarily stopped state S5, if execution of the engine application 39A$_k$ is stopped by execution stop processing for the engine application 39A$_k$ that is temporarily stopped so that there is no longer an application that is temporarily stopped, the engine section 40 makes a transition from the application temporarily stopped state S5 to the application loaded state S3. On the other hand, in the application temporarily stopped state S5, in the event that there is another temporarily stopped application even if execution of the engine application 39A$_k$ is stopped due to stop processing for the engine application 39A$_k$, there is no state transition in the engine section 40.

(6) Engine Application Pause Processing

Figure 20:
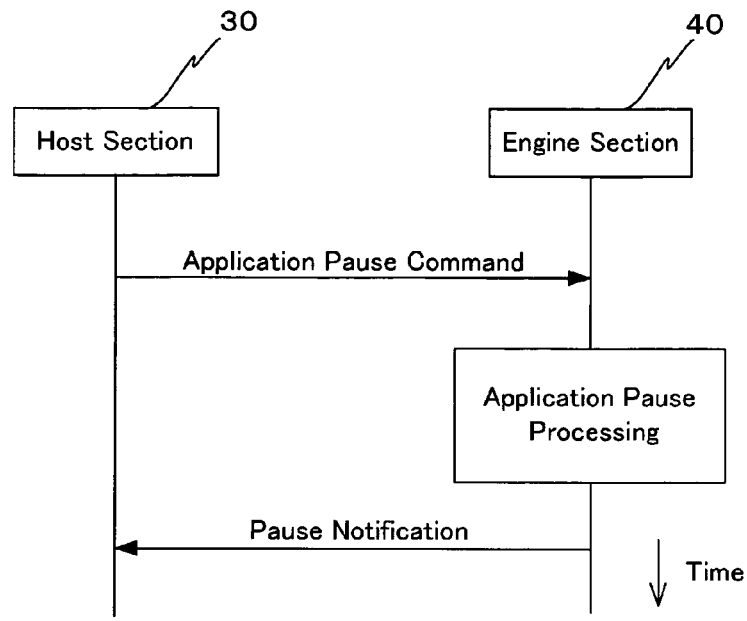
FIG. 20 is a sequence chart for describing application pause processing.

The engine application 39A$_k$ that is operating is temporarily stopped using the procedure shown in FIG. 20 in the application operation state S4. Note that, pause processing for the engine application 39A$_k$ is carried out in response to pause instruction for the engine application 39A$_k$ as a result of the operator operating the operation section 21.

In this application pause processing, first of all the host section 30 transmits an application stop command, with an identifier of the engine application 39A$_k$ as attached data, to the engine section 40, similarly to the case of the above mentioned application stop command. At the engine section 40, the application control section 120 receives the application pause command. The application control section 120 that has received this pause command causes execution of the engine application 39A$_k$ to temporarily stop, and transmits temporarily stopped notification for the engine application 39A$_k$ to the host section 30.

If execution of the engine application 39A$_k$ is temporarily stopped by pause processing for the engine application 39A$_k$ so that there is no longer an application that is operating, the state of the engine section 40 makes a transition from the application operation state S4 to the application temporarily stopped state S5, as shown in FIG. 6. As a result, there is a change from engine mode to host mode. On the other hand, in the event that there is an application that is operating even if execution of the engine application 39A$_k$ is temporarily stopped due to pause processing for the engine application 39A$_k$, the state of the engine section 40 does not change.

(7) Restart Processing for Engine Application Resulting From User Instruction.

Figure 21:
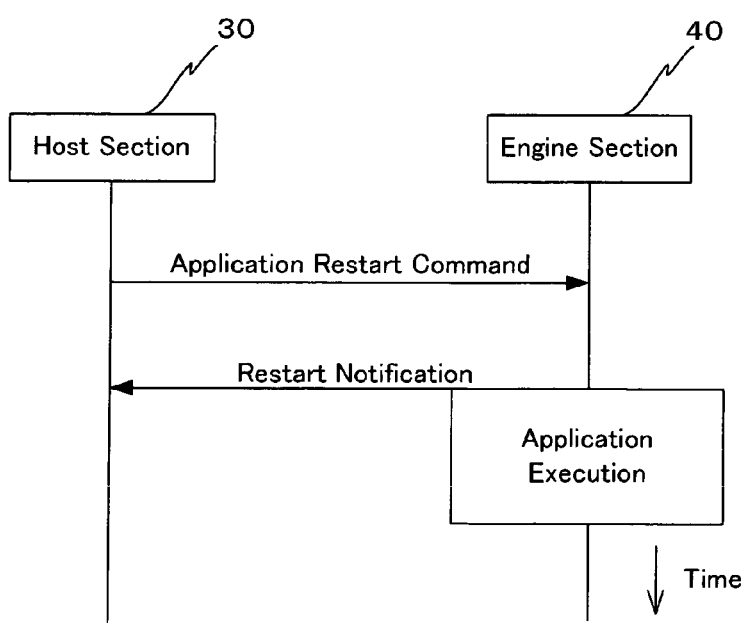
FIG. 21 is a sequence chart for describing application restart processing.

The engine application 39A$_k$ that is temporarily stopped, as described above, can be restarted using the procedure shown in FIG. 21 in response to a pause instruction for the engine application 39A$_k$ due to the user operating the operation section 21 and so forth.

With this application restart processing, first of all the host section 30 transmits an application restart command, with an identifier of the engine application 39A$_k$ as attached data, to the engine section 40, similarly to the case of the above mentioned application pause command. At the engine section 40, the application control section 120 receives the application restart command. The application control section 120 that has received this restart command causes execution of the engine application 39A$_k$ to restart, and transmits a restart notification for the engine application 39A$_k$ to the host section 30.

If execution of the engine application 39A$_k$ is restarted by restart processing for the above described engine application 39A$_k$ in the application temporarily stopped state S5, the state of the engine section 40 makes a transition from the application temporarily stopped state S5 to the application operation state S4, as shown in FIG. 14. As a result, there is a change from host mode to engine mode. On the other hand, in the event that execution of the engine application 39A$_k$ is restarted by the restart processing for the engine application 39A$_k$ in the application operation state S4, the state of the engine section 40 does not change.

Note that, with respect to application load processing, application unload processing, application execution commencement processing, application stop processing and application restart processing, in the event that an error response is returned to the host section 30 or in the event that a response is not returned from the engine section 40 to a command from the host section 30 and the host section 30 detects a timeout error, the host section 30 notifies the command to the engine section 40 again. If an error response is also returned to re-notification of this command, or a time-out error is detected, the host section 30 displays an indication that the response from the engine section 40 to the command is an error response, or an indication that there is no response from the engine section 40, on the main display section 25M, and notifies the user. When error display is carried out in this manner, the user operates the operation section 21 to perform a rest instruction for the engine section 40, and restoration measures such repair from initialization of the engine section 40 is carried out.

Also, with this embodiment, with respect to application pause processing, in the event that an error response is returned to the host section 30 or in the event that a response is not returned from the engine section 40 to a command from the host section 30 and the host section 30 detects a timeout error, the host section 30 performs the above described application stop processing or processing to issue a reset instruction signal RST.

In this manner, the host section 30 and the engine section 40 operate in a coordination fashion while operation of the engine section 40 is controlled by the host section 30, and the engine section 40 appropriately executes applications.

Note that, during operation of an application in the engine section 40, in the event that normal completion conditions are detected for an application, or an error is detected, that fact is notified to the engine integrated control program $39_0$. The engine integrated control program $39_0$ that receives this notification itself exceptionally causes the application to terminate without waiting for application stop instruction from the host section 30, the fact that the application has terminated and a reason for termination are notified via the host interface section 52 to the host section 30, and handling after that is entrusted to the host section 30.

[Application Save Processing]

Next, description will focus on an operation of saving data relating to the engine application $39A_k$ (k=1, 2, . . . ) to the host section 30.

It is assumed that the engine integrated control program $39_0$ and engine application $39A_k$ have already been loaded into the engine section 40. Also, the engine application $39A_k$ is being executed in the engine section 40. That is, the engine section 40 is in state S4.

(1) Data Save During Execution of Engine Application

Next, the execution of the engine application $39A_k$ is started as described above, and description will be given for processing relating to save candidate data generated during this execution (except for stop processing).

Save candidate data during execution of the engine application $39A_k$ in this way is user designated save candidate data, which is data designated by the user, and application designated save candidate data which is data designated by the engine application $39A_k$. As user designated save candidate data there is, for example, the users favorites among display images during execution of the engine application $39A_k$, that is, data for best shot images taken by the user. This kind of user designated save candidate data is not used when re-executing the engine application $39A_k$ after it has been stopped. For this reason the user designated save candidate data is always second type save data.

As application designated save candidate data there is, for example, data for highest score when highest score up to now (so-called "high score") is obtained, in the event that the engine application $39A_k$ is a game application for assigning a score at the time of game clear. This kind of application designated save candidate data may be used or not used when re-executing the engine application $39A_k$ after it has been stopped. Therefore, there are cases where the application designated save candidate data belongs to a first type save data and cases where it belongs to second type save data. Note that the application designated save candidate data belongs to first type save data or belongs to second type save data can invariably be determined by the engine application that has designated the application designated save candidate data.

First of all, processing related to user designated save candidate data will be described with reference mainly to FIG. 22.

Figure 22:
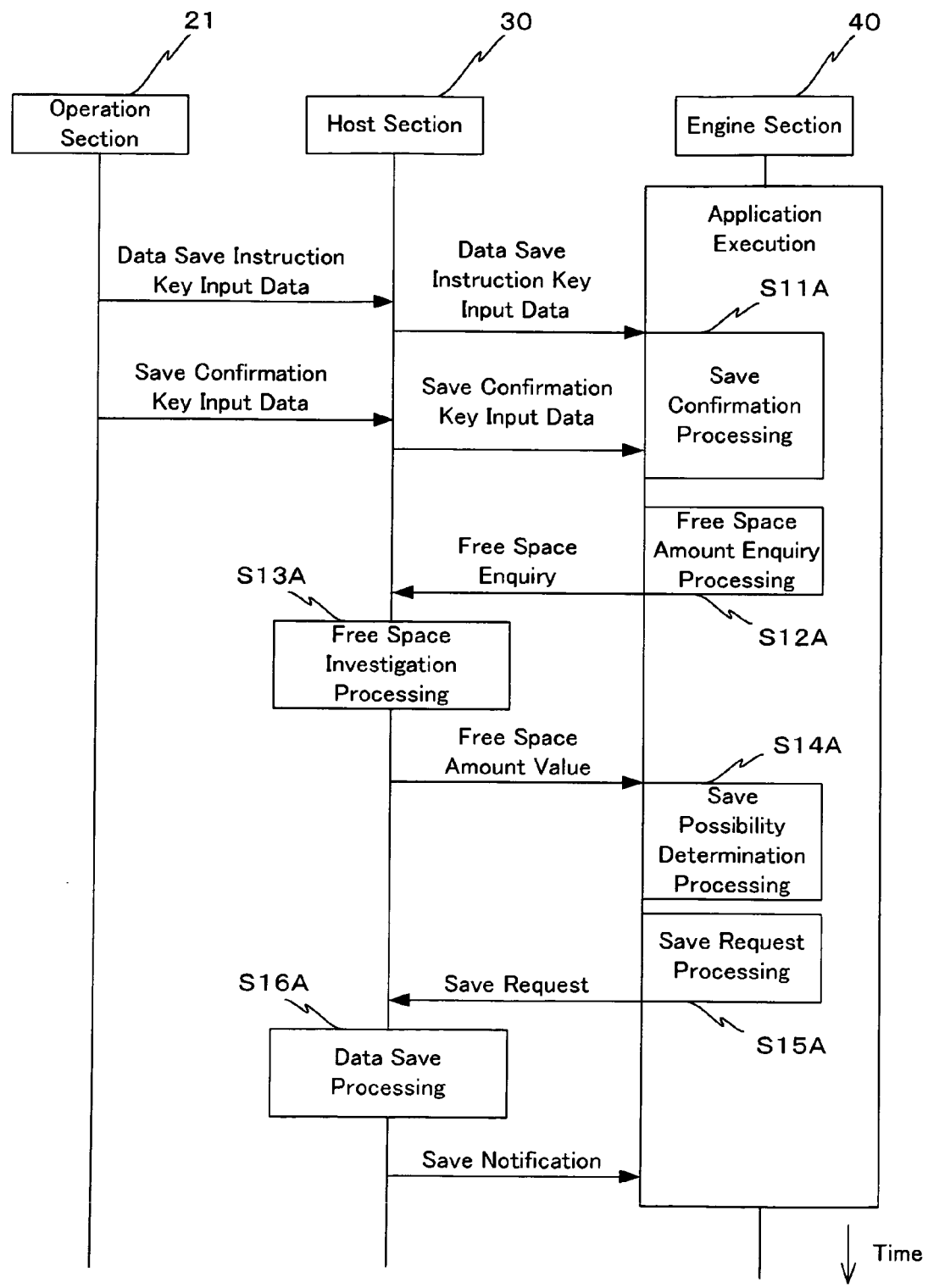
FIG. 22 is a sequence chart for describing coordination processing relating to save of user designated data by the host section and the engine section.

In the case of processing related to user designated save candidate data, as shown in FIG. 22, during execution of the engine application $39A_k$ in the engine section 40 key input of data save instructions designated save candidate data is carried out from the operation section 21 by the user. The host program 38 of the host section 30 that has received this key input data notifies the key input data as is to the engine section 40.

At the engine section 40 that has received the key input data of the data save instruction, the engine integrated control program $39_0$ analyzes the received key input data and confirms that the key input data represents a save instruction for specified data. In step S11A, the data save conformation section 111 in the engine integrated control program $39_0$ executes save confirmation processing.

With the save confirmation processing in this step S11A, first of all the data save confirmation section 111 displays a save confirmation screen on the main display section 25M. With this save confirmation screen, specific information of save candidate data and an enquiry as to whether or not to carry out and save it are displayed. If key input of data save confirmation is carried out from the operation section 21 by the user looking at the save confirmation screen, the host section 30 notifies the key input data as is to the engine section 40, similarly to the case for the data save instruction key input.

In the engine section 40, the data save confirmation section 111 receives key input data for data save confirmation. Continuing on, the data save confirmation section 111 analyzes the received key input data and confirms that the key input data represents save confirmation. If it is determined in this way that save confirmation has been performed by the user the data save confirmation section 111 terminates display of the save confirmation screen, and notifies the fact that there is save confirmation and the fact that save candidate data has been designated by the user to the free space enquiry section 112. After that, the save confirmation processing of step S11A is completed.

When the user looking at the save confirmation screen provides key input indicating not to save, the data save confirmation section 111 that has confirmed this fact completes display of the save confirmation screen without performing notification to the free space enquiry section 112, and completes the save confirmation processing of step S11A.

The free space enquiry section 112 that receives notification from the data save confirmation section 111 performs free space enquiry processing in step S12A. With this free space enquiry processing, first of all the free space enquiry section 112 determines that the save candidate data is second type save data from the fact that the save candidate data is user designated save candidate data. The free space inquiry section 112 then transmits a free space enquiry with respect to a storage region for the second type save data $39D2_k$ relating to the engine application $39A_k$ being executed in the engine section 40 to the host section 30. After that, the free space enquiry processing of step S12A is completed.

At the host section 30, the free space notification section 82 receives a capacity enquiry from the engine section 40. The free space notification section 82 that receives the capacity enquiry then performs free space examination processing in step S13A.

With the examination processing for this free space, first of all the free space notification section 82 analyzes the contents of the capacity enquiry, and determines which region's free space can be examined. This time, it is determined that the subject of the free space examination is a storage region for the second type save data $39D2_k$.

Continuing on, the free space notification section 82 examines free space that is the examination object of free space, that is, free space. The free space notification section 82 then notifies a free space value, which is a result of the examination, to the engine section 40. After that, the free space examination processing of step S13A is completed.

At the engine section 40, the save possibility determination section 113 receives a free space value from the host section 30. The save possibility determination section 113 that receives the free space value then performs save possibility determination processing in step S14A.

In this save possibility determination processing, the save possibility determination section 113 determines whether or not the data amount of the save candidate data is less than or equal to the free space value notified from the host section 30. When the result of this determination is affirmative, indication of this fact, and indication of the fact that the save candidate data is data to be saved (save data), are notified to the data save request section 114 by the save possibility determination section 113. After that, the save possibility determination processing of step S14A is completed.

Note that, when the determination result by the save possibility determination section 113 is negative, the save possibility determination section 113 displays indication that there is insufficient free space for saving and indication that data save should be done again after confirming free space on the main display section 25M. After that, the save possibility determination processing of step S14A is completed without any notification to the data save request section 114.

The data save request section 114 that receives notification from the save possibility determination section 113 performs save request processing in step S15A. In this save request processing, the data save request section 114 transmits a save request to the host section with save data, an identifier for the engine application being executed and a data type identifier as attached data. On this occasion, the data save request section 114 transmits a save request to the host section 30 with save data, an identifier for the engine application 39A$_k$ and an identifier representing whether there is type two save data as attached data. After that, the save request processing of step S15A is completed.

The data save section 81 receives the save request in the host section 30. The data save section 81 then carries out data save processing in step S16A. In this data save processing, first of all the data save section 81 specifies a storage region for the save data that has arrived from the engine section 40 as an attachment to the save request based on an identifier for the engine application being executed and a data type identifier. On this occasion, a storage region for the second type save data 39D2 is specified as the save data storage region.

Continuing on, the data save section 81 stores save data in a specified region. After that, the data save processing of step S16A is completed.

Next, processing related to application designated save candidate data will be described with reference mainly to FIG. 23.

Figure 23:
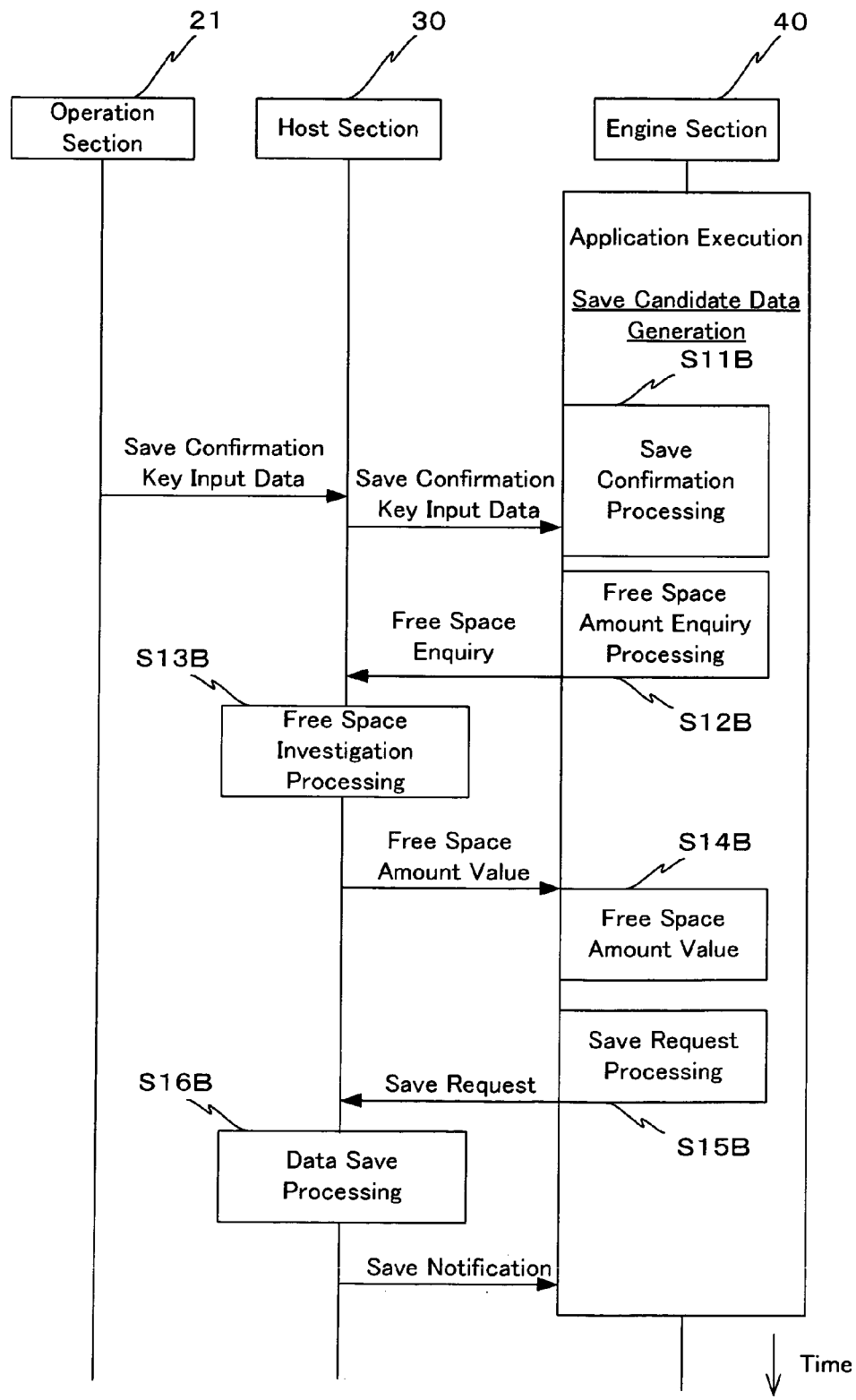
FIG. 23 is a sequence chart for describing coordination processing relating to save of application designated data by the host section and the engine section.

In the case of saving application designated save candidate data to the host section 30, as shown in FIG. 23, save candidate data is generated during execution of the engine application 39A$_k$ in the engine section 40. With generation of this save candidate data, the fact that it has occurred, save candidate data, and specified information of the save candidate data are notified to the engine integrated control program 39$_0$. If this notification is carried out, the data save confirmation section 111 in step S11B, performs save confirmation processing similarly to the case of the above described step S11A.

Continuing on, similarly to steps S12A to S16A described above, steps S12B to S16B are executed. Note that, in steps S12B to S16B, when the save candidate data belongs to second type save data the same processing as for steps S12A to S16A is carried out. On the other hand, when the save candidate data belongs to first type save data, processing is carried out with first type save data in steps S12A to S16A instead of second type save data.

Execution of the engine application 39A$_k$ is started as described above, and save of save candidate data generated during this execution (except for stop processing) is carried out.

(2) Data Save at the Time of Engine Application Execution Stop

Next, processing related to save candidate data When execution of the engine application 39A$_k$ is stopped will be described with reference mainly to FIG. 24.

Figure 24:
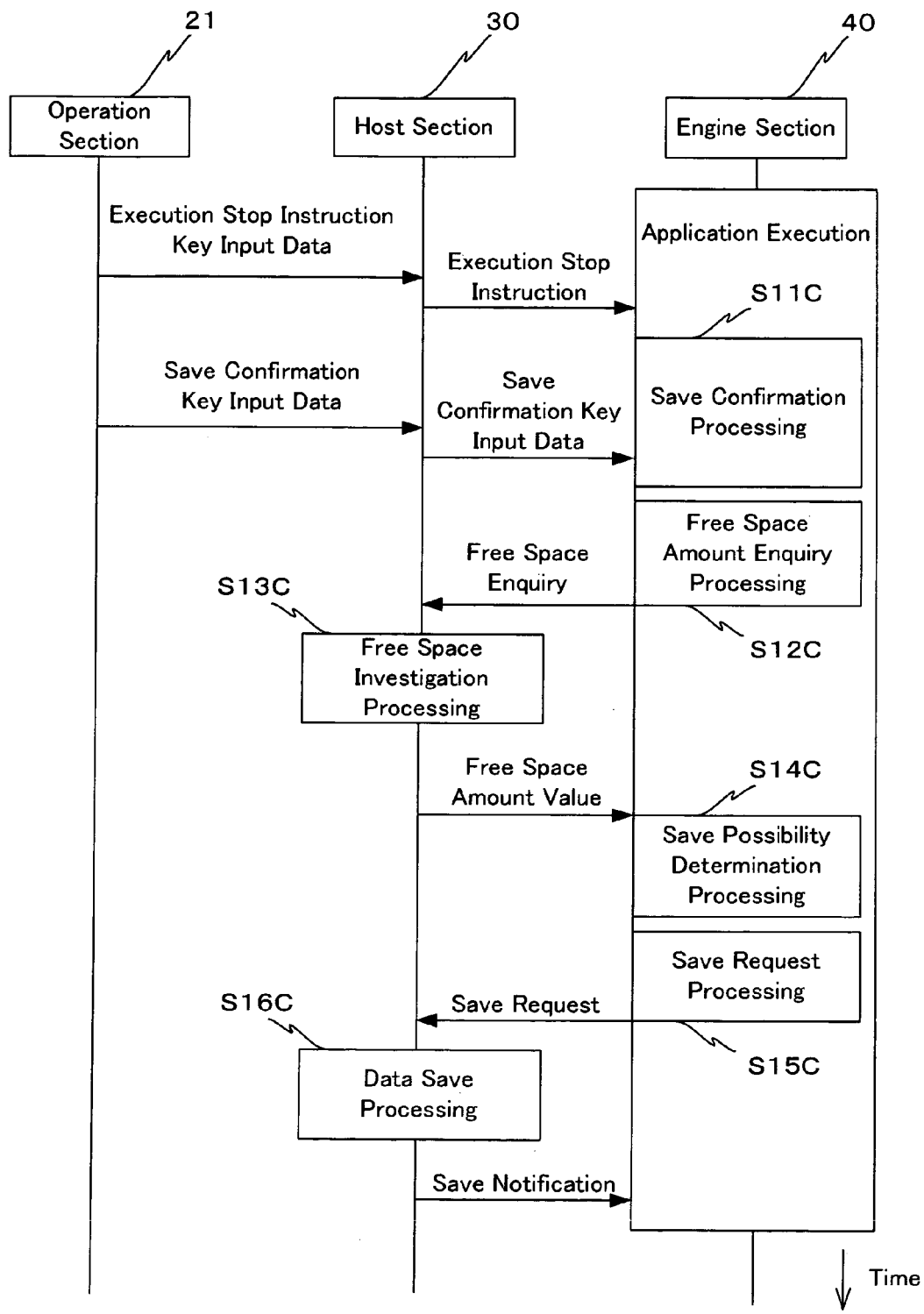
FIG. 24 is a sequence chart for describing coordination processing relating to save of data at the time of application stopping by the host section and the engine section.

As shown in FIG. 24, when the user stops the engine application 39A$_k$, keys of the operating section 21 are operated, as has been described above, and an execution stop instruction for the engine application 39A$_k$ is performed. If the execution stop instruction is carried out in this manner, indication of this is notified to the host section 30. The host section 30 that has received this notification transmits an execution stop command to the engine section 40, with an identifier for the engine application to be stopped as attached data.

At the engine section 40, the engine integrated control program 39$_0$ receives the execution stop command. The engine application program 39$_0$ that has received the execution stop program performs stop processing for the engine application 39A$_k$. As a result of this stop processing, state information data for the engine application 39A$_k$ required at that point in time as information data for commencing from the current state at the time of the next execution commencement of the engine application 39A$_k$ is extracted as save candidate data. Note that, there is a possibility that this type of state information data will be used the next time the engine application 39A$_k$ is executed, and so it belongs to first type save data.

If this save candidate data is extracted, the data save confirmation section 111 duplicate, in step S11C, performs save confirmation processing similarly to the case of the above described step S11A. Continuing on, similarly to steps S12A to S16A described above, steps S12C to S16C are executed. Note that, in steps S12C to S16C, since the save candidate data belongs to first type save data, processing is carried out with second type save data in steps S12A to S16A made first type save data.

In the above-described manner, processing related to save candidate data at the time of execution stop for the engine application 39A$_k$ is carried out.

Note that, even when the engine application is stopped while being temporarily stopped, similarly to the above-described case where the engine application is stopped during execution, state information data for the engine application required at that point in time as information data for commencing from the current state at the time of the next execution commencement is extracted as save candidate data. After that, processing similar to steps 11C to S16C is carried out, and processing related to save candidate data at the time of stopping the engine application while being temporarily stopped is carried out.

When second type save data is saved after stopping the engine application, as described above, the host section 30 suitably reads out second type save data, and displays it on the main display section 25M or transmits to a mobile communication network via the wireless communication section 32.

(3) Second and Subsequent Execution of Engine Application

Next description will be given for second and subsequent execution start operations for the engine application 39A$_k$.

If the user operates keys of the operating section 21 to carry out second or subsequent execution start instruction for the engine application $39A_k$, indication of this is notified to the host section 30. The host section 30 that has received this notification first of all determines whether or not first type save data $39D1_k$ relating to the engine application $39A_k$ exists.

When the result of this determination is negative, similarly to the above described initial execution start instruction, the host section 30 transmits an application execution commencement command, with only an identifier of the engine application $39A_k$ as attached data, to the engine section 40. On the other hand, when the result of this determination is affirmative, the host section 30 transmits an application execution commencement command, with an identifier of the engine application $39A_k$ and first type save data $39D1_k$ as attached data, to the engine section 40.

The engine section 40 that has received the application execution commencement command analyzes the command content, and confirms that an execution commencement command has been received for an engine application $39A_k$ not including first type save data. Continuing on, when the attached data contains first type save data $39D1_k$ the engine section stores first type save data $39D1_k$ in the application region 47 of the storage section 42.

Next, when the attached data does not contain first type save data $39D1_k$, the engine section 40 executes the engine application $39A_k$ from the initial state and notifies an execution commencement notification for the engine application $39A_k$ to the host section 30. On the other hand, when first type save data is contained in the attached data the engine section 40 entrusts selection of whether to execute the engine application $39A_k$ from the initial state or to restart execution from a previous stopped state to the user. The engine section 40 then commences execution of the engine application $30A_k$ from the initial state, corresponding to the user selection result.

[Processing at the Time of Power Supply Control]

Next, description will be given focusing on before and after change of supply conditions for supply of operational power to the engine section 40 except the case that the above described device power supply is turned ON.

(1) Processing for Stopping and Restarting Engine Section Operation

During supervision and control of operation of the engine section 40 by the host section 30 described above, occasion may occur where it is anticipated that it is permissible to stop operation of the engine section 40 for the time being. As such cases, there are, for example, cases where (i) engine application load processing is not carried out for a specified period after initial load, (ii) a state where an engine application loaded but the loaded engine application is not executed continues for a specified period, and (iii) an event (hereafter referred to as an engine stop event) occurs such as the second section 12 being folded away even though only an engine application using the main display section 25M has been loaded.

Figure 25:
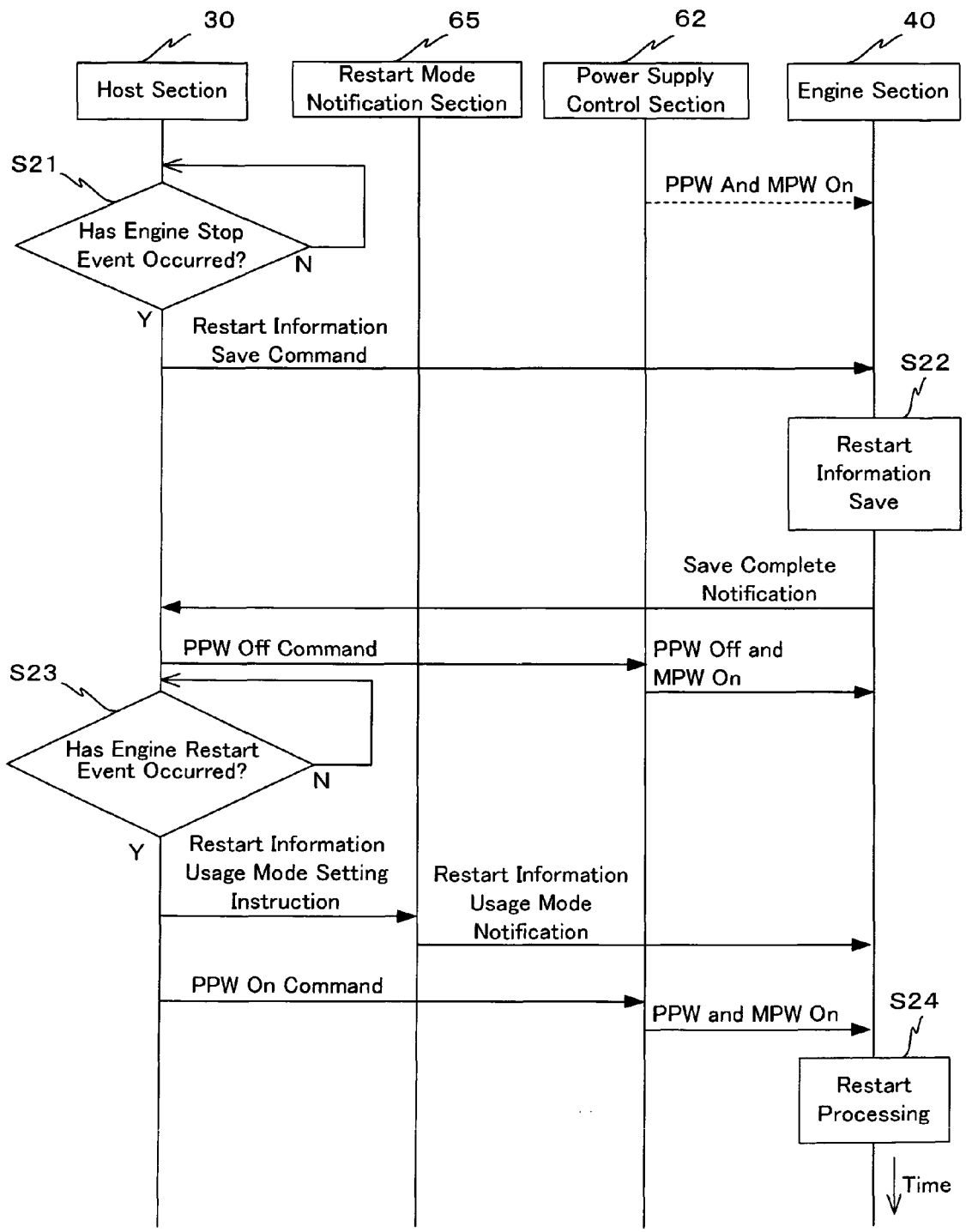
FIG. 25 is a sequence chart for describing processing at the time of suspension or restart of operational power to only the engine processor.

As shown in FIG. 25, at the host section 30, in step S21, the occurrence of an engine stop event is monitored. Then, if an engine stop event occurs and there is an affirmative determination in step S21, at the host section 30 a restart information save command instructing the engine section 40 to save information for processing restart and to stop operation is transmitted by the restart information save request section 71 to the engine section 40.

If this restart information save command is received, at the engine section 40, in step S22, the restart information save section 101 saves restart information, being information for restarting processing at the current point in time, in the storage section 42. In this step S22, if the engine application $39A_k$ is being executed the engine application $39A_k$ is temporarily stopped. Then, state information for the engine application $39A_k$ for restarting the engine application $39A_k$ from the operating state at the time of pause, information representing that the engine application $39A_k$ has been stopped in response to a restart information save command, and state information for the engine integrated control program $39_0$ to restart processing from the operating state at the current time are saved in the storage section 42 as restart information. On the other hand, when the engine application $39A_k$ is not being executed, state information for the engine integrated control program $39_0$ to restart processing from the operating state at the current time is stored in the storage section 42 as restart information.

If the restart information is save in the storage section 42 in this way, a save completion notification is returned from the engine section 40 to the host section 30. At the host section 30 that has received the save complete notification, the power supply control command section 76 transmits an indication that only supply of operating, power PPW should be stopped to the power supply control section 62 as a power supply control command PSC. The power supply control section 62 then stops only supply of operating power PPW. As a result, supply of operational power to the engine processor 41 is stopped, and operation of the engine section 40 is stopped. On the other hand, since supply of operating power MPW to the storage section 42 continues the stored contents of the storage section 42 are maintained.

After that, in step S23 the host section 30 monitors for the occurrence of an engine restart event, which is an event representing that operating of the engine section 40 should be restarted. As such an engine restart event, there are, for example, (i) the occurrence of necessity for a command signal to the engine section 40 in response to a command from the user via the operating section 21, and (ii) opening up of the second section 12.

If an engine restart event occurs and there is an affirmative determination in step S23, at the host section 30 the restart mode setting instruction section 75 transmits the fact that restart information usage mode for using restart information when restarting processing should be notified to the engine section 40 to the restart mode notification section 65 as a restart mode setting command RMS. The restart mode notification section 65 then transmits an indication that there is restart information usage mode to the engine section 40 as a restart mode notification RM.

Continuing on, the power supply control section 62 of the host section 30 transmits a command for indication that supply of operating power PPW should be restarted to the power supply control section 62 as a power supply control command PSC. The power supply control section 62 that has received the command for indication that supply of operating power PPW should be restarted then restarts supply of operating power PPW.

Once supply of operating power PPW has been restarted in this way, execution of the basic interface program 59 is started in the engine section 40. Once execution of the basic interface program 59 starts, at the engine section 40, first of all the basic interface program 59 refers to a restart mode notification RM and determines whether initialization mode or restart information usage mode is being designated as a process restart mode. At this stage, since restart information usage mode is designated as the restart mode, in the engine section 40, in step S24, restart processing for restarting processing from the state immediately before supply of operating power PPW was stopped previously is carried out.

In the restart processing, first of all the engine integrated control program $39_0$ is restarted from the state immediately before supply of operating power PPW was stopped previously using state information for process restart of the engine integrated control program $39_0$ in the restart information saved in the storage section 42. Continuing on, the engine integrated control program $39_0$ determines whether or not there is a temporarily stopped engine application $39A_k$ in response to the above-described restart information save command, based on restart information. In the event that this determination is affirmative, the engine integrated control program $39_0$ restarts processing of the engine application $39A_k$ using restart state information for the engine application $39A_k$ in the restart information.

(2) Processing When the Device Power Supply is Turned OFF

First of all, description will be given for a case where the user operates a power supply key in the operating section 21 in a state where operational power PPW and operational power MPW is being supplied to the engine section 40, that is, an operating state of the engine section 40, to perform a power supply OFF command.

Figure 26:
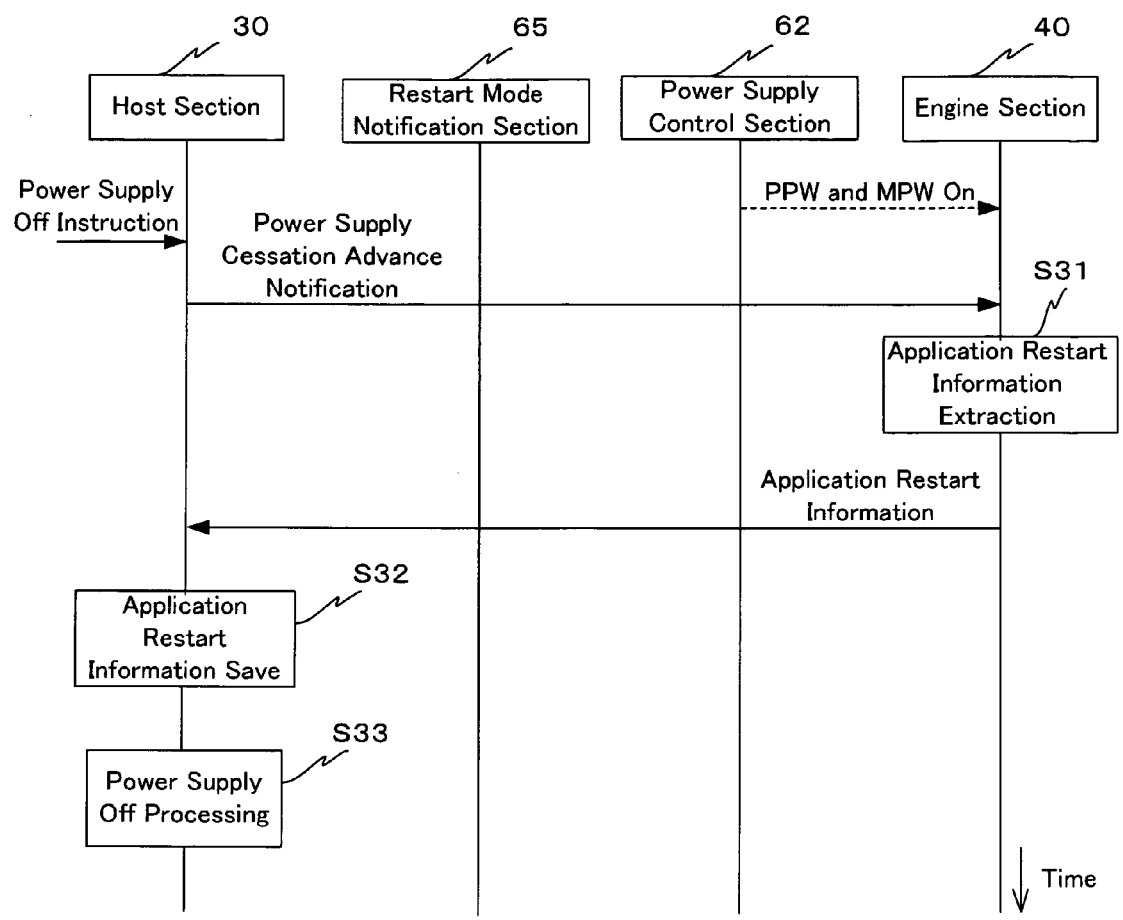
FIG. 26 is a first sequence diagram for explaining processing at the time of power up.

In this case, as shown in FIG. 26, if the power supply off command is executed by the user, the power supply cessation advance notification section 72 of the host section 30 transmits a power supply cessation advance notification to the engine section 40. At the engine section 40 that has received the power supply cessation advance notification, in step 31, the application restart information notification section 102 extracts application restart information. In this extraction processing for application restart information, in the case where the engine application $39A_k$ is being executed the engine application $39A_k$ is stopped or temporarily stopped, and state information of the engine application $39A_k$ is extracted in order to restart execution of the engine application $39A_k$ from the state at the point in time where it was stopped or temporarily stopped. Also, in the case where the engine application $39A_k$ is temporarily stopped, state information of the engine application $39A_k$ is extracted in order to restart execution of the engine application $39A_k$ from the state immediately before the previous pause.

Application restart information that has been extracted in this way is transmitted to the host section 30 from the application restart information notification section 102. Note that, in the case where a loaded engine application is either stopped or does not exist, indication that there is no application restart information is transmitted to the host section 30.

At the host section 30 that has received the application restart information relating to the engine application $39A_k$, in step S32, the data save section 73 saves received application restart information in a region of the non-volatile region 37 inside the storage section 35 that has been assigned to restart information for the engine application $39A_k$.

If the application restart information save processing is completed in this way, the host section 30 performs power supply off processing in step 33. The device power supply is then turned off.

Next, description will be given for a case where the user operates a power supply key in the operating section 21 in a state where operational power PPW to the engine section 40 is stopped but operational power MPW is supplied, that is, an operating stop state of the engine section 40, to perform a power supply OFF command.

Figure 27:
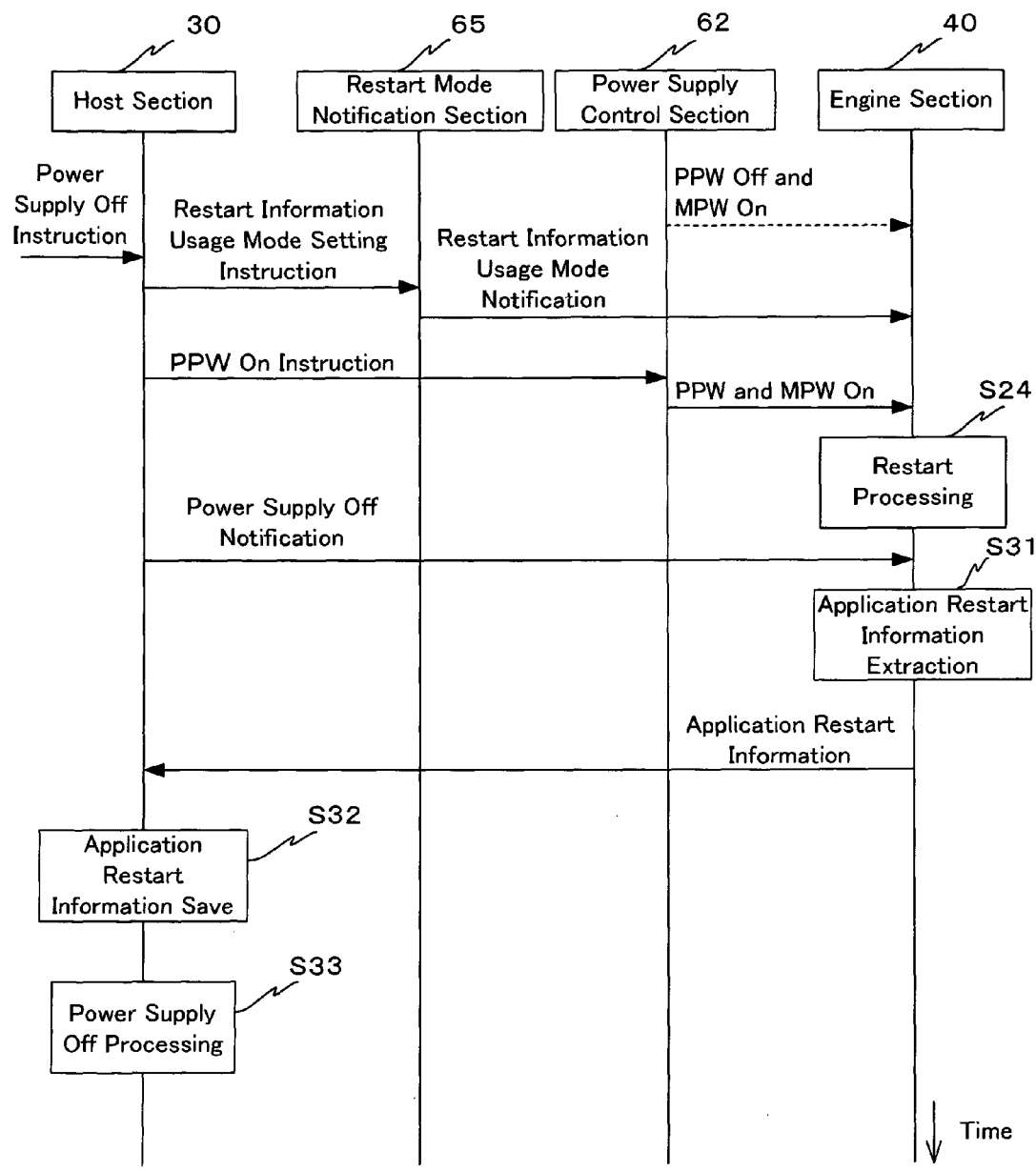
FIG. 27 is a second sequence diagram for explaining processing at the time of power up.

In this case, as shown in FIG. 27, if the power supply off command is performed by the user, first of all processing of the engine section 40 is restarted, similarly to the case where the above mentioned engine restart event occurred. After this, processing similar to the case where a power supply off command is performed by the user in the operating state of the engine section 40 described above is carried out, and after application restart information has been saved in the host section 30 the device power supply is turned off.

After turning the device power supply off in the above described manner, in the event that the device power supply is turned on processing similar to the above described device power supply on is carried out. Then, if a load instruction for engine application $39A_k$ is performed by the user, an application load command with the engine application $39A_k$ and restart information for the engine application $39A_k$ as attached data is transmitted from the host section 30 to the engine section 40.

As has been described above, with this embodiment, engine processor programs $39_0$, $39A_1$, . . . (and, as required, first type save data) that have been stored in a non-volatile region 37 of the storage section 35 connected to the host processor 31 of the host section 30, for execution on the engine processor 41 of the engine section 40, are transmitted from the host section 30 to the engine section 40. At the engine section 40 that has received the engine processor programs $30_0$, $39A_1$, . . . , the engine processor programs $30_0$, $39A_1$, . . . , are stored in the volatile storage section 42 connected to the engine processor 41. After that, the host section 30 notifies an execution instruction for a particular program, being one of the engine processor programs $39_0$, $39A_1$, . . . , stored in the storage section 42, to the engine section 40 and causes execution on the engine processor.

Therefore, in the engine section 40, it is sufficient to store in the non-volatile storage section only a basic interface program 59 capable of acting as an interface to the host section 30 while being able to realize a function for receiving program data, as a program executed by the engine processor. This type of basic interface program 59 is small in size and capable of being incorporated into an engine processor chip, which means that the engine section 40 does not need to be provided with independent non-volatile storage means of large capacity for the purpose of preventing loss of a program for execution of the engine processor due to a power supply being turned off.

Accordingly, according to this embodiment it is possible to significantly reduce increase in hardware amount in the mobile telephone unit 10 overall, when providing an engine processor 41 in addition to the host processor 31. By having the host section 30 that carries out processing related to communication with external sections supervise saving of engine processor programs $39_0$, $39A_1$, . . . , it is also possible to acquire the engine processor program $39_0$, $30A_1$, . . . , inconvenient amendment information and version upgrade information for the engine processor programs $39_0$, $30A_1$, . . . , and so forth through communication with external section.

Also, with this embodiment one of the engine processor programs is made an engine integrated control program $39_0$ for integrated control of the engine section. As a result, the functions of the basic interface program 59 built into the engine processor 41 in advance can be minimized significantly, and it is also possible to prevent the occurrence of inconvenience and to do away with the need for upgrade. It is therefore possible to improve reliability of the engine processor 41, and under control of the engine integrated control program $39_0$, having functions and characteristics for which inconvenient improvements and upgrade can be perfected, it is also possible to execute a diversity of engine processor programs.

Also, with this embodiment transmission of the engine integrated control program $39_0$ from the host section 30 to the engine section 40 is carried out at the time of initialization of the engine section 40. Therefore, it is possible to carry out interaction with the host section 30, such as receipt of all engine applications $39A_1, \ldots$, or receipt of all application execution commands, under control of the engine integrated control program $39_0$, having perfected functions and characteristics, and to execute the engine applications $39_A, \ldots$.

Also with this embodiment, in the event that there is data to be saved relating to an engine application being executed or temporarily stopped in the engine section 40, the engine section 40 transmits a save request to the hot section 30. The host section 30 that has received this save request saves data requested to be saved in a data save region ensured in correspondence with the engine application. It is therefore possible to improve convenience to the user.

Also, with this embodiment, before a data save request, the engine section 40 performs an inquiry for capacity of free space in a save region corresponding to data it is desired to save to the host section 30. The host section 30 that receives this inquiry notifies the amount of free space to the engine section. The engine section 40 that receives the free space notification determines whether or not data it is desired to save can be saved in the free space region. Then, if the result of this determination is affirmative, the engine section 40 transmits a save request to the host section. Therefore, the data save is requested, but it is possible to prevent the occurrence of a situation where the data cannot be saved due to the amount of free space being insufficient.

Also, with this embodiment, before a data save request the engine section 40 confirms whether or not data is to be saved to the user. Then, if the user confirms data save, the engine section 40 transmits a data save request to the host section 30. It is therefore possible to prevent data that is not desired to save being saved in the host section 30.

Also, with this embodiment, when it is estimated that there is no need to cause operation of the engine processor 41 of the engine section 40 at the present time, a restart information save request is transmitted from the host section 30 to the engine section 40 to request save of restart information for restarting processing in the engine section 40 to the storage section 42 of the engine section 40. The engine section 40 that has received this restart information save request saves the restart information in the storage section 42. In this manner, if the save of the restart information in the engine section 40 is completed, the host section 30 stops supply of operational power PPW to the engine processor 41. After this, if it becomes necessary to restart processing by the engine processor 41 corresponding to a user command and so forth, the host section 30 designates using the restart information saved in the storage section 42 when restarting the processing in the engine section 40. The host section 30 then restarts supply of operational power PPW to the engine processor 41. After that, the engine section 40 restarts the process having continuity from before cessation of operational power PPW to the engine processor 41 using the restart information. Accordingly, it is possible to foresee power conservation.

Also, in the case where power supply for the entire mobile telephone unit 10 is turned off, cessation of supply of operational power to the entire engine section 40 is notified in advance by the host section 30. At the engine section 40 that has received this advance notification, application restart information, being restart information for the engine application, is notified to the host section 30. The host section 30 that has received the application restart information saves the application restart information in the storage section 35 of the host section, and stops supply of operating power to the whole of the engine section. After this, if the power supply of the mobile telephone unit 10 is turned on by the user and it becomes necessary to restart processing by the engine section 40, the host section 30 designates that initialization processing should be carried out when restarting the processing in the engine section 40. The host section 30 then restarts supply of operational power to the entire engine section 40. If load of an engine application is then instructed by the user, the host section transmits an application and application restart information to the engine section. Therefore, since two states of operational power supply to the engine section 40 are prepared taking into consideration restart of processing in the engine section 40, it is possible to carry out fine control at the time of operational power to the engine section 40.

Also, since application restart information that has been notified from the engine section 40 is saved in the non-volatile region 37 inside the storage section 35, it is possible to avoid loss of application restart information even in the event that supply of power to the entire mobile telephone unit 10 is interrupted.

Note that, with the above described embodiment, at the time of saving data relating to the engine application to the host section, the user confirms data save no matter what the type and content of the save candidate data. Conversely, it is possible to omit confirmation of data save by the user depending on the type and content of the save candidate data. Further, it is possible to omit confirmation of data save by the user regardless of the type and content of the save candidate data.

Also, with the above described embodiment, the size of regions for respectively storing the first type save data $39D1_k$ and the second type save data $39D2_k$ in the non-volatile region 37, in the MCD, is predetermined. Conversely, in the event that an engine application $39A_k$ designates sizes of regions for respective storage of first type save data $39D1_k$ and second type save data $39D2_k$ in management information, it is possible to reserve regions of the designated size.

Also, with the above described embodiment, save of application restart information to the host section 30 accompanying interruption of supply of operating power to the entire engine section 40 is carried out when power supply to the entire mobile telephone unit 10 is turned off. Conversely, also in cases where there is an explicit instruction by the user after stopping operational power to only the engine processor 41 or after a specified time has elapsed, it is possible to stop supply of operational power to the entire engine section 40 in addition to saving the application restart information to the host section 30.

Note that it is also possible for the host processor 31 to be a single processor, or to be two processors, namely a communication processor and an application control processor, and for control of the engine section 40 in the above described embodiment to be carried out on an application control processor.

Also, with the above described embodiment, the display output selection section 53 and the audio output selection section 54 are built into the engine processor 41, but it is also possible to arrange at least one of them outside the engine processor 41.

Also, with the above-described embodiment, the host interface section 52 is provided with a dual port RAM, but any structure is possible provided it is possible to interface with the host section 30.

Also, with the above described embodiment, application load processing and application unload processing are not carried out in the application operation state S4. Conversely, it is also possible to carry out these processing operations in the application operation state S4.

Also, with the above described embodiment, retry is not performed with respect to the application pause processing, but it is also possible to carry out retry for the application pause processing.

Also, with the above described embodiment, when an application detected distinctive completion conditions, the engine integrated control program $39_0$ that receives notification of that fact stops the application without waiting for an application stop command from the host section 30. Conversely, it is also possible for the engine integrated control program $39_0$ that receives the notification to transmit a issue request for the application stop command to the host section 30.

Also, with the above-described embodiment, the mobile terminal, it is a clamshell type, but the present invention can also be applied to mobile terminals of straight type, revolver type or slide type.

Also, in the above-described embodiment, the present invention has been applied to a mobile telephone unit, but obviously the present invention may also be applied to other mobile communication terminals.

As has been described above, the coordination operation method of the present invention can be applied to coordination operation of a host section, having a host processor, for carrying out processing relating to communication with external sections, and an engine section, having an engine processor, for executing applications under the supervision of the host section.

The present invention can also be applied to a mobile communication terminal provided with a host section for carrying out processing relating to communication with external sections, and an engine section for executing applications under the supervision of the host section.

What is claimed is:

1. A coordination operation method, in which a host section for performing processing relating to communication with an external section, and an engine section for executing applications using at least one of a display output section and an audio output section under management by the host section, are operated in a coordinated fashion in a mobile communication terminal, comprising the steps of:

transmitting an engine processor program, stored in non-volatile storage means connected to a host processor of the host section, for execution in an engine processor of the engine section, from the host section to the engine section;

storing the engine processor program received by the engine section into a volatile engine memory means connected to the engine processor;

executing an instruction of a specified program, one of the engine processor program, transmitted from the host section, stored in the engine memory means;

executing the specified program using the engine storage means, in the engine section that has received the execution instruction of the specified program;

selecting a host display image signal from the host section or an engine display image signal from the engine section;

supplying the selected image signal to a main display section, said selecting and supplying being performed by a display output selection section in the engine processor; and controlling supply of a first operating power to the engine processor and a second operating power to the volatile engine memory means independently, said controlling being performed in dependence upon one or more control signals from the host section, wherein the main display section is controlled by the engine section in an engine mode during an application operation state and is controlled by the host section in a host mode during an idle state, wherein the selecting by the display output selection section is performed in dependence upon a designation by a host output control signal from the host section and an engine output control signal from the engine section;

wherein when priority display of a host image is designated by the host output control signal, the display output selection section selects the host display image signal and outputs it as the selected image signal regardless of designation by the engine output control signal;

wherein when priority display of a host image is not designated by the host output control signal, the display output selection section selects one of the host display image signal and the engine display image signal for output as the selected image signal in dependence upon designation by the engine output control signal.

2. The coordination operation method of claim 1, wherein the engine processor program transmitted from the host section comprises an integrated control program for controlling the engine section integratedly, and application programs.

3. The coordination operation method of claim 2, wherein transmission of the engine integrated control program from the host section to the engine section is carried out at the time of initialization of the engine section.

4. The coordination operation method of claim 2, wherein the application program is transmitted from the host section to the engine section after commencement of execution of the engine integrated control program in the engine section.

5. The coordination operation method of claim 1, further comprising the steps of:

being transmitted a save request for specified data relating to the application from the engine section to the host section; and being stored the specified data saving the specified data in a specified data save region ensured in the non-volatile storage means in correspondence with the application by the host section that has received the save request specified data.

6. The coordination operation method of claim 5, further comprising the steps of:

being performed an enquiry for amount of free space of the specified data save region from the engine section to the host section; and being reported the amount of free space by the host section that has received the enquiry; and determining whether or not it is possible to save the specified data in the free region by the engine section that has received the report; and wherein executing the data save request step, when the determination result of the save possibility determination step is affirmative.

7. The coordination operation method of claim 5, further comprising a step of:

being confirmed to a user whether or not the specified data is saved by the engine section, and wherein being executed the data save request step, when the confirmation in the data save confirmation step is affirmative.

8. The coordination operation method of claim 5, wherein information data for restarting the application is included in the specified data.

9. The coordination operation method of claim 5, wherein data instructed with a data save command by a user is included in the specified data.

10. The coordination operation method of claim 1, further comprising steps of:

requesting for transmitting a restart information save request to the engine section for requesting to save engine restart information in the engine storage means, for restarting processing in the engine section, the engine section from the engine storage means;

saving the restart information save request saving the restart information received by the engine section in the engine storage means;

stopping to supply of operational power to the engine processor by the host section;

designating use mode of the restart information to utilize the restart information by the host section, when restarting processing in the engine section;

restarting supply of operational power to the engine processor by the host section; and restarting processing using the restart information by the engine section.

11. The coordination operation method of claim 10, further comprising steps of:

transmitting to the engine section an operational power cessation advance notice for giving prior notice of stopping of operational power to all sections of the engine section from the host section;

notifying the application restart information by the engine section that has received the operational power cessation advance notice, being restart information for the application, to the host section;

saving the application restart information received by the host section, stored in the non-volatile storage means;

stopping supply of operational power to all sections of the engine section instructed from the host section;

designating an initial mode that initialization processing should be carried out, when restarting processing in the engine section, instructed from the host section;

restarting supply of operational power to all sections of the engine section, instructed by the host section;

starting the initialization processing is performed by the engine section; and transmitting the application program and the application restart information for loading the application to the engine section, instructed by the host section.

12. The coordination operation method of claim 10, wherein the restart information save request step is executed when an event that estimates that the application will not presently restart occurs.

13. The coordination operation method of claim 12, wherein the event is the lapse of a predetermined time after pausing of the application.

14. A mobile communication terminal, in which a host section for performing processing relating to communication with an external section, and an engine section for executing applications using at least one of a display output section and an audio output section under management by the host section, are operated in a cooperative fashion, wherein the host section comprises:
a host processor;
non-volatile storage means, connected to the host processor, for storing an engine processor program for transmission to the engine section;
program transmission means for reading out the engine processor program from the non-volatile storage means and transmitting to the engine section; and
program execution commencement instruction means for designating a specified program, among engine processor programs transmitted to the engine section, and transmitting an execution instruction of the specified program in the engine section to the engine section, and the engine section comprises:
an engine processor, having a display output selection section for selecting one of a host display image signal from the host section and an engine display image signal from the engine section, wherein the display output selection section supplies the selected image signal to the display output section;
volatile engine storage means, connected to the engine processor, for storing the engine processor programs transmitted from the host section; and
program storage means, for storing the engine processor programs transmitted from the host section in the engine storage means,
wherein the host section controls supply of a first operating power to the engine processor and a second operating power to the volatile engine storage means independently, said control being performed in dependence upon one or more control signals from the host section,
wherein the display output section is controlled by the engine section in an engine mode during an application operation state and is controlled by the host section in a host mode during an idle state,
wherein the selecting by the display output selection section is performed in dependence upon a designation by a host output control signal from the host section and an engine output control signal from the engine section;
wherein when priority display of a host image is designated by the host output control signal, the display output selection section selects the host display image signal and outputs it as the selected image signal regardless of designation by the engine output control signal;
wherein when priority display of a host image is not designated by the host output control signal, the display output selection section selects one of the host display image signal and the engine display image signal for output as the selected image signal in dependence upon designation by the engine output control signal.

15. The mobile communication terminal of claim 14, wherein the engine section comprises data save request means for transmitting a save request for specified data relating to the application to the host section, and the host section comprises data save means for saving the specified data in a specified data save region ensured in the non-volatile storage means in correspondence with the application, in response to the specified data save request.

16. The mobile communication terminal of claim 15, wherein the engine section further comprises:
free space enquiry means for performing an enquiry for amount of free space of the specified data save region, to the host section; and
save possibility determination means, for determining whether or not it is possible to save the specified data in the free space based on response results from the host section to the enquiry by the free space enquiry means, and the host section further comprises:
free space notification means for notifying the amount of free space in response to the enquiry, and wherein when the determination result by the save possibility determination means is affirmative, the specified data save request is performed by the data save request means.

17. The mobile communication terminal of claim 15, wherein the engine section further comprises data save confirmation means for confirming to a user whether or not the specified data is saved, and wherein the specified data save request is performed by the data save request means, when the confirmation by the data save confirmation means is affirmative.

18. The mobile communication terminal of claim 14, comprising:
   operational power supply control means, for independently controlling operational power supply to the engine processor and operation power supply to the engine storage means in response to operational power supply instructions from the host section; and
   process restart mode notification means for notifying process restart mode to the engine section in response to a process restart mode setting instruction from the host section, and wherein
   the host section further comprises:
   restart information save request means for transmitting to the engine section a restart information save request for requesting save of engine restart information, for restarting processing in the engine section, in the engine storage means,
   engine processor operational power supply instruction means, for transmitting an engine processor operational power supply cessation command, for stopping supply of operational power to the engine processor, and an engine processor operational power supply restart command for restarting supply of operational power to the engine processor, to the operational power supply control means, and
   restart information usage mode setting instruction means for transmitting a setting instruction for notification of restart information usage mode for using the restart information to the process restart mode notification means, when restarting a process in the engine section, and wherein the engine section further comprises restart information save means for saving the restart information in the engine storage section.

19. The mobile communication terminal of claim 18, wherein the host section further comprises:
   operational power cessation advance notification means, for transmitting to the engine section an operational power cessation advance notice for giving prior notice of stopping of operational power to all sections of the engine section,
   engine section operational power supply instruction means, for transmitting an engine section operational power supply cessation command, for stopping supply of operational power to the whole of the engine section, and an engine section operational power supply restart command for restarting supply of operational power to the whole of the engine section, to the operational power supply control means,
   initialization mode setting instruction means for transmitting a setting instruction for notification of initialization mode, which should be started from initialization, to the process restart mode notification means, when restarting a process in the engine section, and
   application restart information save means for saving application restart information notified from the engine section in the non-volatile storage section, and
   the engine section further comprises application restart information notification means for notifying the application restart information to the host section when the operational power cessation advance notification is received.

20. The mobile communication terminal of claim 14, wherein the host section further comprises a wireless communication section, connected to the host processor, for carrying out wireless communication with a base station of a mobile communication network.

* * * * *